US008031180B2

(12) United States Patent
Miyamoto et al.

(10) Patent No.: US 8,031,180 B2
(45) Date of Patent: Oct. 4, 2011

(54) TOUCH SENSOR, DISPLAY WITH TOUCH SENSOR, AND METHOD FOR GENERATING POSITION DATA

(75) Inventors: Saburo Miyamoto, Soraku-gun (JP); Toshihisa Nakano, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 1657 days.

(21) Appl. No.: 10/487,338

(22) PCT Filed: Jul. 18, 2002

(86) PCT No.: PCT/JP02/07331
§ 371 (c)(1),
(2), (4) Date: Feb. 20, 2004

(87) PCT Pub. No.: WO03/019346
PCT Pub. Date: Mar. 6, 2003

(65) Prior Publication Data
US 2004/0217945 A1    Nov. 4, 2004

(30) Foreign Application Priority Data

Aug. 22, 2001  (JP) ................................. 2001-252076
Dec. 5, 2001   (JP) ................................. 2001-371246
Jun. 12, 2002  (JP) ................................. 2002-171739

(51) Int. Cl.
*G06F 3/041* (2006.01)
(52) U.S. Cl. ....................................... 345/173; 145/156
(58) Field of Classification Search ............... 345/87, 345/156–166, 169–182; 178/18.01
See application file for complete search history.

(56) References Cited

U.S. PATENT DOCUMENTS

| | | | |
|---|---|---|---|
| 3,971,013 A | 7/1976 | Challoner et al. |
| 4,290,061 A | 9/1981 | Serrano |
| 4,740,781 A | 4/1988 | Brown |
| 4,839,634 A | 6/1989 | More et al. |
| 4,853,498 A | 8/1989 | Meadows et al. |
| 5,194,852 A | 3/1993 | More et al. |
| 5,642,134 A | 6/1997 | Ikeda |
| 5,742,322 A | 4/1998 | Cranton et al. |
| 5,764,321 A | 6/1998 | Koyama et al. |

(Continued)

FOREIGN PATENT DOCUMENTS

FR    2 557 341 A1    6/1985

(Continued)

OTHER PUBLICATIONS

Supplementary Partial European Search Report mailed Apr. 21, 2006 in corresponding EP application 02747697.7.

(Continued)

*Primary Examiner* — Alexander S Beck
*Assistant Examiner* — Mansour M Said
(74) *Attorney, Agent, or Firm* — Nixon & Vanderhye P.C.

(57) ABSTRACT

A display device with a touch sensor according to the present invention includes an active matrix substrate 4A and a transparent counter electrode 7. On a first surface of the active matrix substrate, multiple pixel electrodes are arranged in matrix. The transparent counter electrode is opposed to the first surface of the active matrix substrate. The display device further includes a first circuit, a second circuit and a switching circuit. The first circuit supplies a voltage or a current to the transparent counter electrode for display purposes. The second circuit detects currents flowing from a number of points on the transparent counter electrode. And the switching circuit selectively connects electrically one of the first and second circuits to the transparent counter electrode.

19 Claims, 18 Drawing Sheets

U.S. PATENT DOCUMENTS

| | | | |
|---|---|---|---|
| 5,790,106 A | | 8/1998 | Hirano et al. |
| 5,825,345 A | * | 10/1998 | Takahama et al. ............ 345/104 |
| 5,844,175 A | * | 12/1998 | Nakanishi et al. ......... 178/18.03 |
| 5,945,973 A | * | 8/1999 | Sakai et al. ................... 345/104 |
| 5,945,980 A | | 8/1999 | Moissev et al. |
| 5,995,172 A | | 11/1999 | Ikeda et al. |
| 6,061,480 A | | 5/2000 | Kisaichi et al. |
| 6,239,389 B1 | * | 5/2001 | Allen et al. ................ 178/18.01 |

FOREIGN PATENT DOCUMENTS

| | | |
|---|---|---|
| JP | 51-58823 A | 5/1976 |
| JP | 56-097137 A | 8/1981 |
| JP | 58-208877 A | 12/1983 |
| JP | 60-005325 A | 1/1985 |
| JP | 3-50621 A | 3/1991 |
| JP | 5-4256 | 1/1993 |
| JP | 8-137607 A | 5/1996 |
| JP | 09-128146 | 5/1997 |
| WO | 80/01762 | 9/1980 |

OTHER PUBLICATIONS

Translation of the International Preliminary Examination Report mailed Mar. 6, 2004 in corresponding PCT Application No. PCT/JP02/07331.

Supplementary Search Report mailed Sep. 15, 2006 in corresponding EP application No. 0274697.7.

* cited by examiner (a)

(b)

(c)

(a)

(b)

ern phase of international
application PCT/JP02/07331 filed 18 Jul. 2002, which designated the US. PCT/JP2/07331 claims priority to JP Application No. 2001-252076 filed 22 Aug. 2001, JP Application No. 2001-371246 filed 05 Dec. 2001 and JP Application No. 2002-171739 filed 12 Jun. 2002. The entire contents of these applications are incorporated herein by reference.

TOUCH SENSOR, DISPLAY WITH TOUCH SENSOR, AND METHOD FOR GENERATING POSITION DATA

This application is the US national phase of international application PCT/JP02/07331 filed 18 Jul. 2002, which designated the US. PCT/JP2/07331 claims priority to JP Application No. 2001-252076 filed 22 Aug. 2001, JP Application No. 2001-371246 filed 05 Dec. 2001 and JP Application No. 2002-171739 filed 12 Jun. 2002. The entire contents of these applications are incorporated herein by reference.

TECHNICAL FIELD

The present invention relates to a touch sensor which can locate a point on a display plane that has been touched with a pen or a finger, a display device with such a touch sensor, and a method of generating location data.

BACKGROUND ART

A touch sensor is an input device for sensing a point that has been touched with a finger or a pen. Examples of known location sensing techniques include electrostatic capacitive coupling type, a resistive film type, an infrared ray type, an ultrasonic type, and electromagnetic induction/coupling type. Among other things, touch sensors of the resistive film type or electrostatic capacitive coupling type are used extensively.

Hereinafter, a touch sensor of the resistive film type will be described. As shown in FIG. 22, a touch sensor of an analog resistive film type includes two transparent resistive films 12 and 14 facing each other with an air layer 13 interposed between them, a PET film 11 provided on the opposite side of the transparent resistive film 12 so as to not face the air layer 13, and a glass film 15 provided on the opposite side of the transparent resistive film 14 so as to not face the air layer 13. Of the two transparent resistive films 12 and 14, one transparent resistive film 12 is provided with a pair of conductive portions 16 that are spaced apart from each other in a Y-axis direction. The other transparent resistive film 14 is provided with a pair of conductive portions 17 that are spaced apart from each other in an X-axis direction. Alternatively, the transparent resistive film 12 may be provided with the conductive portions 17 and the transparent resistive film 14 may be provided with the conductive portions 16 instead.

In a touch sensor of this resistive film type, when the operating plane thereof is touched with a finger, for example, the transparent resistive films 12 and 14 contact, and become electrically continuous, with each other at that point of contact (i.e., press point), thereby obtaining the coordinates of the point of contact.

A voltage is applied between the pair of conductive portions (e.g., conductive portions 16) of one of the two transparent resistive films 12 and 14 (e.g., transparent resistive film 12). In this case, when the resistive films 12 and 14 contact with each other, the resistive films 12 and 14 become electrically continuous with each other and current flows through the transparent resistive film 14. Accordingly, by detecting the voltage of the transparent resistive film 14, the Y coordinate of the point of contact can be detected based on that voltage value.

Hereinafter, a specific example will be described. For example, a voltage gradient is created in the transparent resistive film 12 by applying a voltage of 0 V to one of the two conductive portions 16 of the transparent resistive film 12 and a voltage of 5 V to the other conductive portion 16, respectively. Meanwhile, no voltage is applied to the other transparent resistive film 14. In this case, if contact is made at the center of the transparent resistive film 14, for example, a voltage of 2.5 V, which is half of 5 V, is detected from the transparent resistive film 14. Alternatively, if contact is made at a point that is located close to the conductive portion to which 5 V has been applied, a voltage close to 5 V is detected from the transparent resistive film 14. As another alternative, if contact is made at a point that is located close to the conductive portion to which 0 V (i.e., no voltage) has been applied, a voltage close to 0 V is detected from the transparent resistive film 14. In this manner, the Y coordinate of the point of contact can be detected based on the voltage that has been detected from the transparent resistive film 14.

In detecting the X coordinate of the point of contact as in the Y coordinate thereof, a potential difference is created between the pair of conductive portions 17 of the transparent resistive film 14, no voltage is applied to the transparent resistive film 12, and the voltage at the point of contact is detected by way of the transparent resistive film 12. By alternately detecting the X and Y coordinates in this manner, the press point can be located.

In the touch sensor of this analog resistive film type, the air layer 13 is provided between the two transparent resistive films 12 and 14 to make the two transparent resistive films 12 and 14 electrically continuous with each other ay the press point. However, if the air layer 13 is present, then reflection will occur at the interface between the transparent resistive film 12, 14 and the air layer 13 due to the difference in refractive index between the transparent resistive film 12, 14 and the air layer 13. Accordingly, an image display device equipped with a touch sensor of such an analog resistive film type has a darkened display. A touch sensor of such an analog resistive film type is disclosed in Japanese Utility Model Laid-Open Publication No. 5-4256.

On the other hand, a touch sensor of an analog electrostatic capacitive coupling type typically includes a single location sensing transparent conductive film. As disclosed in Japanese National-Phase Publication 56-500230, in a touch sensor of the analog electrostatic capacitive coupling type, an alternating current voltage with the same phase and same potential is applied from each of the electrodes at the four corners of the location sensing transparent conductive film, and a substantially uniform electric field is applied to the entire location sensing transparent conductive film.

When a point of contact is given at some location on the location sensing transparent conductive film, currents flow from the four corners of the location sensing transparent conductive film. And by measuring the amounts of currents at these four corners, the X and Y coordinates of the point of contact can be detected.

Comparing the touch sensor of the resistive film type with the touch sensor of the electrostatic capacitive coupling type, the touch sensor of the latter type has a higher transmittance than the touch sensor of the former type because the touch sensor of the former type needs an air layer but the touch sensor of the latter type doesn't. In addition, the touch sensor of the electrostatic capacitive coupling type ensures better impact resistance and dustproofness than the touch sensor of the resistive film type, and therefore, is able to operate properly for a longer time even if somewhat soiled.

Even a touch sensor of the electrostatic capacitive coupling type, however, is supposed to be combined with a display panel. Accordingly, a touch sensor that can further check the decrease in transmittance of the display panel is now in high demand. Furthermore, a display panel including such a touch sensor as an integral part thereof needs to further reduce its size and weight.

Also, in the touch sensor of the analog electrostatic capacitive coupling type as disclosed in Japanese National Phase Publication No. 56-500230, a complicated electrically conductive segment pattern 19 such as that shown in FIG. 23 needs to be provided around the periphery of the location sensing transparent conductive film 18 to locate the point of contact accurately enough. If the conductive pattern gets complicated, however, then the non-effective range where no location sensing can be carried out expands. For that reason, a touch sensor of an electrostatic capacitive coupling type including simpler circuits is now in high demand.

DISCLOSURE OF INVENTION

In order to overcome the problems described above, an object of the present invention is to provide a touch sensor, which does not deteriorate display performance and which is lightweight and contributes to downsizing effectively, a display device with such a touch sensor, and a method of generating location data.

Another object of the present invention is to provide a touch sensor, including simpler circuits than conventional ones, and a display device with such a touch sensor.

A display device with a touch sensor according to an embodiment of the present invention includes: an active-matrix substrate including multiple pixel electrodes that are arranged in matrix on a first surface thereof; and a transparent counter electrode, which is opposed to the first surface of the active-matrix substrate. The display device further includes: a first circuit for supplying a voltage or current to the transparent counter electrode for display purposes; a second circuit for detecting currents flowing from multiple points on the transparent counter electrode; and a switching circuit for selectively connecting electrically one of the first and second circuits to the transparent counter electrode, thereby solving at least one of the problems described above.

The switching circuit may periodically switch the electrical connection of the first or second circuit to the transparent counter electrode in response to a control signal.

At least a portion of the first circuit, at least a portion of the second circuit, and the switching circuit each may include a thin-film transistor that is provided on the active-matrix substrate.

The thin-film transistor may include polysilicon that is deposited on the active-matrix substrate.

The transparent counter electrode may include a plurality of divided areas, and a current flowing between both ends of each said area may be detected by the second circuit.

The display device may further include a liquid crystal layer between the pixel electrodes and the transparent counter electrode.

The transparent counter electrode may be provided on another substrate that faces the substrate, and the liquid crystal layer may be sealed between the two substrates.

The display device may further include an organic EL layer between the pixel electrodes and the transparent counter electrode.

A display device with a touch sensor according to another embodiment of the present invention includes: a first substrate including multiple scanning electrodes that are arranged on a first surface thereof; and a second substrate including multiple data electrodes that are opposed to the first surface of the first substrate. The display device further includes: a first circuit for supplying a voltage or current to each said data electrode for display purposes; a second circuit for detecting currents flowing from multiple points on each said data electrode; and a switching circuit for selectively connecting electrically one of the first and second circuits to the data electrode, thereby solving at least one of the problems described above.

A display device with a touch sensor according to another embodiment of the present invention includes: a first substrate including a first group of electrodes that are arranged on a first surface thereof; and a second substrate including a second group of electrodes that are opposed to the first surface of the first substrate. The display device further includes: a first circuit for supplying a voltage or current to each said electrode of the first group for display purposes; a second circuit for detecting currents flowing from multiple points on each said electrode of the first group; and a switching circuit for selectively connecting electrically one of the first and second circuits to the electrode of the first group, thereby solving at least one of the problems described above.

At least a portion of the first circuit, at least a portion of the second circuit, and the switching circuit each may include a thin-film transistor that is provided on the substrate.

The thin-film transistor may include polysilicon that is deposited on the substrate.

The display device may further include a liquid crystal layer between the first and second substrates.

A display device with a touch sensor according to another embodiment of the present invention includes: a display medium having a display plane with a two-dimensional area; driving means for generating an electric field in a selected portion of the display medium; and location sensing means for locating a point of external contact on a plane, which is defined parallel to the display plane, by an electrostatic capacitive coupling technique. The driving means includes a transparent electrode, and the location sensing means is electrically connected to multiple points of the transparent electrode, thereby detecting a current associated with the point of contact and solving at least one of the problems described above.

A touch sensor according to an embodiment of the present invention locates an external input point on an operating plane, which expands in an X direction and in a Y direction, by an electrostatic capacitive coupling technique. The touch sensor includes: a first location sensing transparent conductive film, which is provided parallel to the operating plane and which is electrically connected to a Y coordinate detecting conductive portion for detecting a coordinate of the input point in the Y direction; a second location sensing transparent conductive film, which is provided so as to face the first location sensing transparent conductive film and which is electrically connected to the Y coordinate detecting conductive portion for detecting the coordinate of the input point in the Y direction; a dielectric layer, which is provided between the first and second location sensing transparent conductive films; and a switching circuit for selectively applying a predetermined voltage to one of the first and second location sensing transparent conductive films, thereby solving at least one of the problems described above.

The switching circuit may make one of the first and second location sensing transparent conductive films electrically continuous alternately.

The touch sensor may further include a detector circuit for calculating the coordinate of the input point in the Y direction based on the amount of current flowing between the input point and the Y coordinate detecting conductive portion and the coordinate of the input point in the X direction based on the amount of current flowing between the input point and the X coordinate detecting conductive portion, respectively.

The Y coordinate detecting conductive portion may be provided on the first location sensing transparent conductive film and may include at least two conductive portions, which are spaced apart from each other in the Y direction. The X coordinate detecting conductive portion may be provided on the second location sensing transparent conductive film and may include at least two conductive portions, which are spaced apart from each other in the X direction.

The dielectric layer may be made of polyethylene terephthalate.

The dielectric layer may also be made of glass.

Glass may be provided on a principal surface of the first or second location sensing transparent conductive film opposite from the dielectric layer. The input point may be defined by way of the glass.

A display device with a touch sensor according to another embodiment of the present invention includes: the touch sensor described above; and a display panel, of which the display plane is provided with the touch sensor, thereby solving at least one of the problems described above.

The display panel may include: a display medium layer; an electrode, which is provided closer to a viewer than the display medium layer is and which drives the display medium layer; and an insulating layer, which is provided even closer to the viewer than the electrode is. A selected one of the first and second location sensing transparent conductive films may be provided so as to face the electrode with the insulating layer interposed between them. By applying a periodically changing oscillating voltage to the electrode, an induced voltage, and eventually an electric field, may be generated in the selected location sensing transparent conductive film. In accordance with a variation in the current to be produced by forming a point of contact on the first and second location sensing transparent conductive films, location data may be generated for the point of contact.

A display device with a touch sensor according to another embodiment of the present invention includes: the touch sensor described above; an active-matrix substrate, which is provided so as to face a selected one of the first and second location sensing transparent conductive films with the display medium layer interposed between them; a display circuit for supplying a voltage or current to the selected location sensing transparent conductive film for display purposes while the predetermined voltage is not applied thereto; a detector circuit for detecting currents flowing from multiple points on the selected location sensing transparent conductive film; and another switching circuit for selectively connecting one of the display and detector circuits electrically to the selected location sensing transparent conductive film, thereby solving at least one of the problems described above.

A display device with a touch sensor according to another embodiment of the present invention includes: a display panel including a display medium layer, an electrode, which is provided closer to a viewer than the display medium layer is and which drives the display medium layer, and an insulating layer, which is provided even closer to the viewer than the electrode is; a location sensing transparent conductive film, which is provided so as to face the electrode with the insulating layer interposed between them; and a detector circuit for detecting variations in currents flowing from multiple points on the location sensing transparent conductive film. By applying a periodically changing oscillating voltage to the electrode, an induced voltage, and eventually an electric field, are generated in the location sensing transparent conductive film. In accordance with the variations in the currents to be produced by forming a point of contact on the location sensing transparent conductive film, location data is generated for the point of contact, thereby solving at least one of the problems described above.

The induced voltage may be a pulse wave that has local maximum values and/or local minimum values periodically.

The oscillating voltage may be used to drive the display medium layer.

The display device may further include: a display circuit for supplying a voltage or current to the electrode so as to drive the display medium layer; and a switching circuit for selectively connecting electrically one of the display and detector circuits to the electrode.

The display panel may be a liquid crystal panel, and the oscillating voltage may be a voltage of which the polarities invert periodically.

The liquid crystal panel may be an active-matrix-addressed liquid crystal panel, and the electrode may be a transparent counter electrode.

The distance between the electrode and the location sensing transparent conductive film may be about 1 mm or less.

The pulse wave may have a frequency of about 40 kHz.

A location data generating method according to an embodiment of the present invention is a method of generating location data for a point of contact on a location sensing transparent conductive film, which is provided so as to face an electrode with an insulating layer interposed between them. The method includes the steps of: applying a periodically changing oscillating voltage to the electrode, thereby generating an induced voltage, and eventually an electric field, in the location sensing transparent conductive film; and generating location data for the point of contact in accordance with variations in currents to be produced by forming the point of contact on the location sensing transparent conductive film, thereby solving at least one of the problems described above.

The electrode may be used to drive a display medium layer of a display panel.

The oscillating voltage may be used to drive the display medium layer of the display panel.

Hereinafter, the functions of the present invention will be described.

A display device with a touch sensor according to a first embodiment of the present invention includes: an active-matrix substrate including multiple pixel electrodes that are arranged in matrix on a first surface thereof; and a transparent counter electrode, which is opposed to the first surface of the active-matrix substrate. The display device further includes: a first circuit for supplying a voltage or current to the transparent counter electrode for display purposes; a second circuit for detecting currents flowing from multiple points on the transparent counter electrode; and a switching circuit for selectively connecting electrically one of the first and second circuits to the transparent counter electrode.

This display device with a touch sensor is provided with no additional transparent conductive film for locating a point of contact of a pen or a finger with a display plane by an electrostatic capacitive coupling technique. Instead, in this display device, one of the first and second circuits is electrically connected to the transparent counter electrode by a switching circuit, thereby using the transparent counter electrode for a display panel on a time-sharing basis and locating the point of contact. Thus, the deterioration in display quality, which should be caused when such an additional transparent conductive film is provided on the front side of a display device, is avoidable. Also, this display device with a touch sensor can have reduced size and weight.

If the switching circuit, as well as a display driver circuit and a location sensor circuit, is made up of thin-film transistors that are provided on the substrate, then high-speed switching is achieved. As a result, the delay in the application of a display voltage, which might be caused during switching, can be minimized.

A touch sensor according to a second embodiment of the present invention locates an external input point on an operating plane, which expands in an X direction and in a Y direction, by an electrostatic capacitive coupling technique. The touch sensor includes: a first location sensing transparent conductive film, which is provided parallel to the operating plane and which is electrically connected to a Y coordinate detecting conductive portion for detecting a coordinate of the input point in the Y direction; a second location sensing transparent conductive film, which is provided so as to face the first location sensing transparent conductive film and which is electrically connected to the Y coordinate detecting conductive portion for detecting the coordinate of the input point in the Y direction; a dielectric layer, which is provided between the first and second location sensing transparent conductive films; and a switching circuit for selectively applying a predetermined voltage to one of the first and second location sensing transparent conductive films.

In this touch sensor, the Y coordinate detecting conductive portion and the X coordinate detecting conductive portion are electrically connected to the first and second location sensing transparent conductive films, respectively. Accordingly, compared with a conventional touch sensor, including just one transparent conductive film provided with a conductive portion for sensing locations in the Y-axis and X-axis directions, the coordinate detecting conductive portions can have simplified patterns. That is to say, each of the coordinate detecting conductive portions occupies a smaller area on its associated transparent conductive film, and therefore, the operating plane can have an increased contact point locatable area.

Also, the switching circuit alternately makes one of the first and second location sensing transparent conductive films electrically conductive, thereby detecting the Y and X coordinates independent of each other. Accordingly, the detection of one of these two coordinates is not affected by that of the other coordinate. As a result, the coordinates of any location can be detected accurately.

A display device with a touch sensor according to a third embodiment of the present invention includes a display panel including an electrode, a location sensing transparent conductive film and a detector circuit. In this display device with a touch sensor, by applying a periodically changing oscillating voltage to the electrode, an induced voltage, and eventually an electric field, are generated in the location sensing transparent conductive film. In accordance with the variations in the currents to be produced by forming a point of contact on the location sensing transparent conductive film, location data is generated for the point of contact.

This display device with a touch sensor generates the location data of the point of contact with respect to the location sensing transparent conductive film by intentionally using the induced voltage, which has normally been regarded as noise. More specifically, by applying a periodically changing oscillating voltage to the electrode, the induced voltage, and eventually an electric field, are generated in the location sensing transparent conductive film. In accordance with the variations in the currents to be produced by forming the point of contact on the location sensing transparent conductive film, location data is generated for the point of contact.

Accordingly, there is no need to provide a wide gap between the location sensing transparent conductive film and the electrode. Also, no shielding layer needs to be provided between the display panel and the location sensing transparent conductive film, either. As a result, a display device with a touch sensor that can have a reduced thickness and that causes small parallax can be provided. Furthermore, in locating the point of contact, no special voltage is applied to the location sensing transparent conductive film but the induced voltage, generated by applying the periodically changing oscillating voltage to the electrode, is used. Thus, no complicated circuit is needed and the power dissipation never increases, either. Furthermore, a voltage, which is essentially supplied to a display panel to drive its display medium layer, may be used as such an oscillating voltage. In addition, no alternating current voltage needs to be separately applied to the location sensing transparent conductive film, thus saving the power dissipation.

BRIEF DESCRIPTION OF DRAWINGS

FIG. 18(b) shows how the induced voltage, generated in a location sensing transparent conductive film when the common voltage shown in FIG. 2(a) is applied to the transparent counter electrode, changes with time, and FIG. 18(c) shows how the voltage applied to the transparent counter electrode changes with time if the common voltage applied to the transparent counter electrode is constant.

BEST MODE FOR CARRYING OUT THE INVENTION

Hereinafter, first, second and third embodiments of the present invention will be described with reference to the accompanying drawings. In the following description, an input point (i.e., a point of contact) is supposed to be defined on a touch sensor by touching an operating plane with a finger or a conductive pen, for example. However, the present invention is not limited to this particular input method. The input may be done either by touching the operating plane with a finger, a conductive pen or any other member or by any non-contact method that uses an infrared ray, an ultrasonic wave or electromagnetic induction.

EMBODIMENT 1

Figure 1:
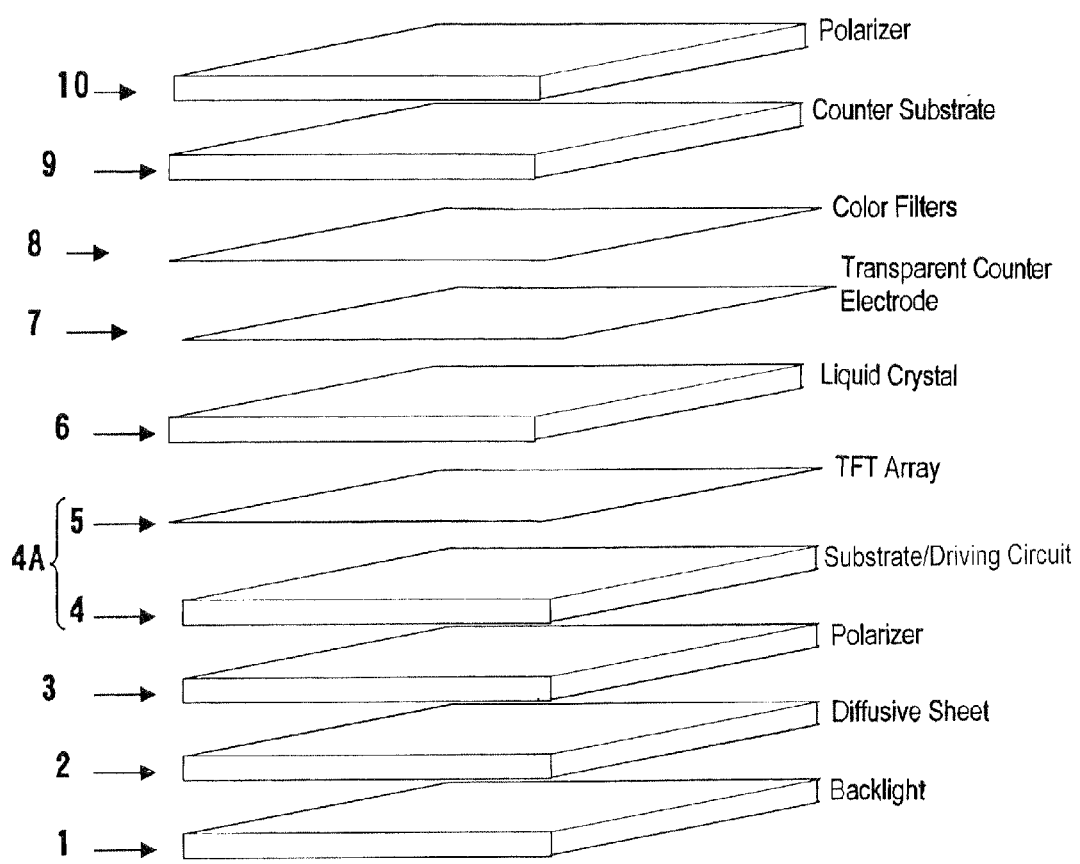
FIG. 1 is a perspective view illustrating a basic configuration for a display device according to a first embodiment.

First, a display device with a touch sensor according to an embodiment of the present invention will be described with reference to FIG. 1. FIG. 1 schematically shows a configuration in which a display device with a touch sensor according to the present invention is applied to a liquid crystal display device. As shown in FIG. 1, a backlight 1, a diffusive sheet 2, a first polarizer 3, a substrate (i.e., first substrate) 4, a TFT array 5, a liquid crystal layer 6, a transparent counter electrode 7, color filters 8, a counter substrate (i.e., second substrate) 9 and a second polarizer 10 are stacked in this order one upon the other.

Hereinafter, a configuration for a liquid crystal display device with a touch sensor according to this first embodiment will be described in further detail.

The TFT array 5 is provided, and pixel electrodes (not shown) are arranged in matrix, on the first surface of the substrate 4, which is made of a transparent insulating material such as glass or plastic. The pixel electrodes are driven by an active-matrix addressing technique. For that reason, the substrate 4A, obtained by providing the TFT array 5 and others on the surface of the substrate 4, will be referred to herein as an "active-matrix substrate".

The TFT array 5 on the substrate 4 is an array of thin-film transistors (TFTs), each including a semiconductor thin layer of amorphous silicon or polysilicon, for example. The substrate 4 actually has a peripheral area surrounding the display area. In the peripheral area, driver circuits (i.e., a gate driver and a source driver) are provided to drive pixel TFTs in the display area and supply a desired quantity of charge to the pixel electrodes. In a preferred embodiment, both the transistors making up those driver circuits and the transistors making up the TFT array in the display area are preferably TFTs of the same type. In that case, to increase the operating speed of the driver circuits, the driver circuits and the TFT array are preferably made up of TFTs each including a polysilicon film. To increase the operating speed of the TFTs to the limit, the barrier to be sensed by carriers passing the grain boundary of the polysilicon film is preferably as low as possible. For that purpose, each TFT is preferably fabricated by using a continuous grain silicon (CGS) film.

It should be noted that the pixel TFTs making up the TFT array are connected to the driver circuits by way of gate lines and data lines (not shown). Furthermore, a protective coating and an alignment film (not shown) are also provided over the active-matrix substrate 4A so as to cover the TFT array 5.

On the surface of the other substrate 9 that is opposed to the active-matrix substrate 4A, the color filters 8 and the transparent counter electrode 7 made of a transparent conductive film (e.g., an ITO film) are stacked in this order so as to face the liquid crystal layer 6.

A desired voltage is generated between the transparent counter electrode 7 and the pixel electrode (not shown) and applied to each region of the liquid crystal layer 6 that is provided between the active-matrix substrate 4A and the counter substrate 9. By applying this voltage, the directions of liquid crystal molecules change and the light that has been emitted from the backlight 1 can be modulated.

The basic arrangement shown in FIG. 1 is extensively used in conventional LCD panels. In this first embodiment, however, the transparent counter electrode 7 shown in FIG. 1 is used not only as a common electrode for display purposes but also as a location sensing transparent conductive film (transparent resistive film).

As described above, if such a location sensing transparent conductive film is added to a conventional LCD panel, then the resultant display quality might deteriorate and a signal for liquid crystal display might constitute noise for a signal for location sensing. However, if an insulating layer (shielding layer) is further provided between the polarizer 10 and the location sensing layer to reduce the noise, then the display quality might further deteriorate. In this embodiment, however, the transparent counter electrode 7 is alternately used as a common electrode for display purposes and as a location sensing transparent conductive film on a time-sharing basis, thus overcoming the display quality deterioration problem.

At the four corners of the transparent counter electrode 7 for use in this embodiment, location sensing electrodes are provided. An alternating current voltage is applied to these electrodes such that an electric field with a small gradient is generated substantially uniformly within the transparent counter electrode 7.

When a person touches the surface of the polarizer 10 or any other insulating member provided thereon with a pen or a finger, the transparent counter electrode 7 is capacitively coupled with the ground (or grounded plane). In this case, the capacitance created is the sum of the capacitance between the polarizer 10 and the transparent counter electrode 7 and the capacitance between the person and the ground.

The value of the electrical resistance between the point of contact and each electrode of the transparent counter electrode 7, which are capacitively coupled together, is proportional to the distance from the point of contact to the electrode. Accordingly, a current flows through each of the electrodes at the four corners of the transparent counter electrode 7 in an amount that is proportional to the distance between the point of contact and each electrode. Thus, by detecting the amounts of these currents, the coordinates of the point of contact can be obtained.

Next, the basic principle of a location sensing method by an electrostatic capacitive coupling technique for use in this embodiment will be described with reference to FIG. 2.

Figure 2:
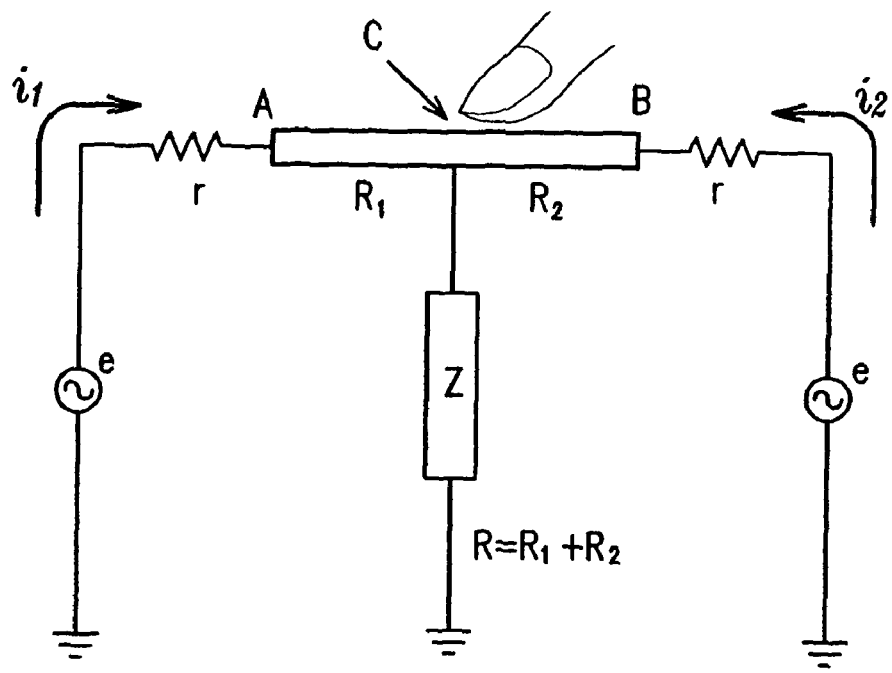
FIG. 2 shows the operating principle of a (one-dimensional) touch sensor of an electrostatic capacitive coupling type.

For the sake of simplicity of description, a one-dimensional resistive body, sandwiched between two electrodes A and B, is shown in FIG. 2. In a display device according to this embodiment, however, the transparent counter electrode 7 with a two-dimensional extent actually performs the same function as this one-dimensional resistive body.

A current-voltage converting resistor r is connected to each of the two electrodes A and B. These electrodes A and B are connected to a location sensor circuit by way of a switching circuit to be described later. In this embodiment, these circuits are provided on the active-matrix substrate 4A.

In the location sensing mode, an (alternating current e) voltage with the same phase and same potential is applied between the electrode A and the ground and between the electrode B and the ground. In this case, the electrodes A and B are always at the same potential level, and therefore, no current flows between the electrodes A and B.

Suppose the resistive body has been touched at a point C with a finger, for example. In this case, the resistance between the point C of finger contact and the electrode A is $R_1$, the resistance between the point C of contact and the electrode B is $R_2$ and $R=R_1+R_2$. Then, supposing the impedance of the person is Z, the current flowing through the electrode A is $i_1$, and the current flowing through the electrode B is $i_2$, the following equations are satisfied:

$$e=ri_1+R_1i_1+(i_1+i_2)Z \quad \text{(Equation 1)}$$

$$e=ri_2+R_2i_2+(i_1+i_2)Z \quad \text{(Equation 2)}$$

The following Equations (3) and (4) are respectively derived from the Equations (1) and (2):

$$i_1(r+R_1)=i_2(r+R_2) \quad \text{(Equation 3)}$$

$$i_2=i_1(r+R_1)/(r+R_2) \quad \text{(Equation 4)}$$

By substituting Equation (4) into Equation (1), the following Equation (5) can be obtained:

$$e = ri_1 + R_1i_1 + (i_1 + i_1(r + R_1)/(r + R_2))Z \quad \text{(Equation 5)}$$
$$= i_1(R(Z+r) + R_1R_2 + 2Zr + r^2)/(r + R_2)$$

The following Equation (6) can be obtained from Equation (5):

$$i_1=e(r+R_2)/(R(Z+r)+R_1R_2+2Zr+r^2) \quad \text{(Equation 6)}$$

In the same way, the following Equation (7) can also be obtained:

$$i_2=e(r+R_1)/(R(Z+r)+R_1R_2+2Zr+r^2) \quad \text{(Equation 7)}$$

In this case, the $R_1$ to $R_2$ ratio can be given by the following Equation (8) using the overall resistance R:

$$R_1/R=(2r/R+1)i_2/(i_1+i_2)-r/R \quad \text{(Equation 8)}$$

As r and R are already known, the $R_1/R$ can be obtained by Equation (8) if the current $i_1$ flowing through the electrode A and the current $i_2$ flowing through the electrode B are measured. It should be noted that $R_1/R$ does not depend on the impedance Z including the person that has touched the resistive body with his or her finger. Accordingly, unless the impedance Z is either zero or infinity, Equation (8) is always satisfied and any variation or state caused by the person or material is negligible.

Figure 3:
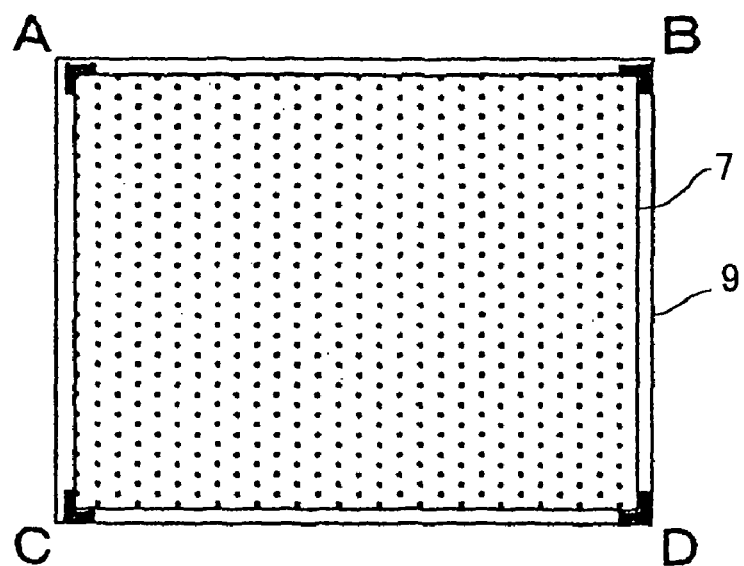
FIG. 3 is a plan view showing an arrangement of electrodes at the four corners of a counter conductive film in the first embodiment.

Next, it will be described with reference to FIGS. 3 and 4 how to expand the equations for the one-dimensional resistive body into those for a two-dimensional resistive body. In this case, four electrodes A, B, C and D are provided at the four corners of the transparent counter electrode 7 as shown in FIG. 3. These electrodes A through D are connected to a location sensor circuit by way of a switching circuit on the active-matrix substrate.

Figure 4:
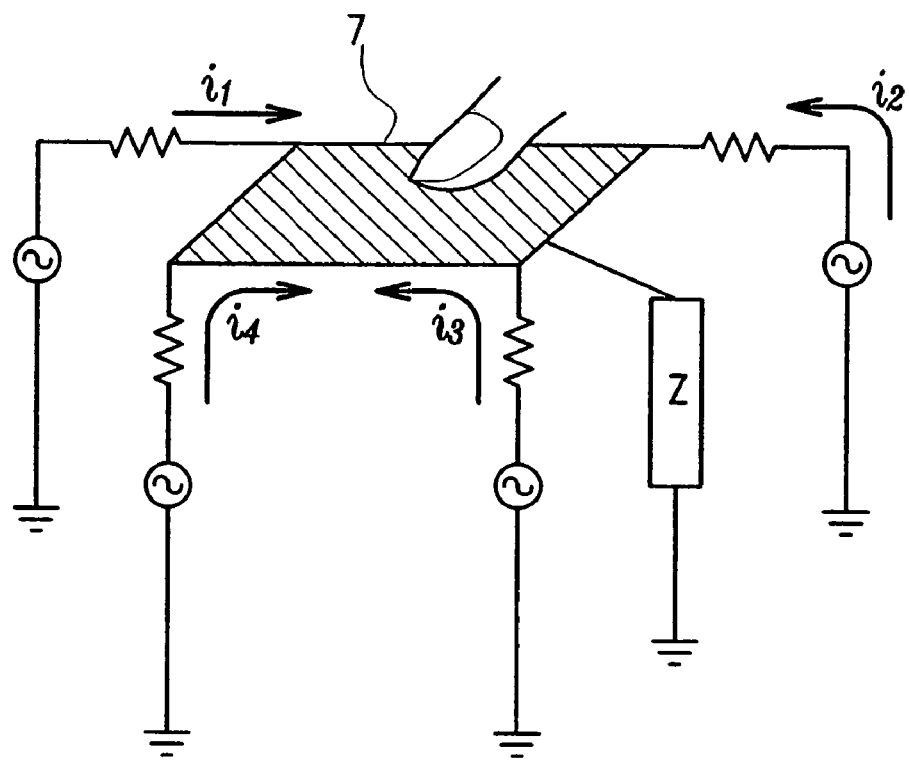
FIG. 4 shows the operating principle of a (two-dimensional) touch sensor of an electrostatic capacitive coupling type.

Referring to FIG. 4, alternating current voltages, having the same phase and same potential, are applied to the electrodes at the four corners of the transparent counter electrode. The currents flowing through these four corners of the transparent counter electrode 7 as a result of finger contact, for example, are identified by $i_1$, $i_2$, $i_3$ and $i_4$, respectively. In that case, according to similar calculations, the following equations are obtained:

$$X=k_1+k_2\cdot(i_2+i_3)/(i_1+i_2+i_3+i_4) \quad \text{(Equation 9)}$$

$$Y=k_1+k_2\cdot(i_1+i_2)/(i_1+i_2+i_3+i_4) \quad \text{(Equation 10)}$$

where X is the X coordinate of the point of contact on the transparent counter electrode 7, Y is the Y coordinate of the point of contact on the transparent counter electrode 7, $k_1$ is an offset and $k_2$ is a magnifying power. $k_1$ and $k_2$ are constants that do not depend on the impedance of the person.

In accordance with these Equations (9) and (10), the point of contact can be located by measuring the amounts of currents $i_1$ through $i_4$ flowing through the four electrodes.

In the example described above, the electrodes are provided at the four corners of the transparent counter electrode 7 and the amounts of currents flowing through these electrodes are measured, thereby locating the point of contact on a plane with a two-dimensional extent. However, the number of electrodes included in the transparent counter electrode 7 is not limited to four. To sense a two-dimensional location, at least three electrodes are needed. But the location sensing accuracy can be increased by using five or more electrodes. The relationship between the number of electrodes and the location sensing accuracy will be described in further detail later.

To detect the coordinates of the point of contact in accordance with the principle described above, the amounts of currents flowing through the multiple electrodes included in the transparent counter electrode 7 need to be measured. Also, in a display mode, the transparent counter electrode 7 needs to apply a predetermined voltage to the liquid crystal layer 6 for display purposes.

Figure 5:
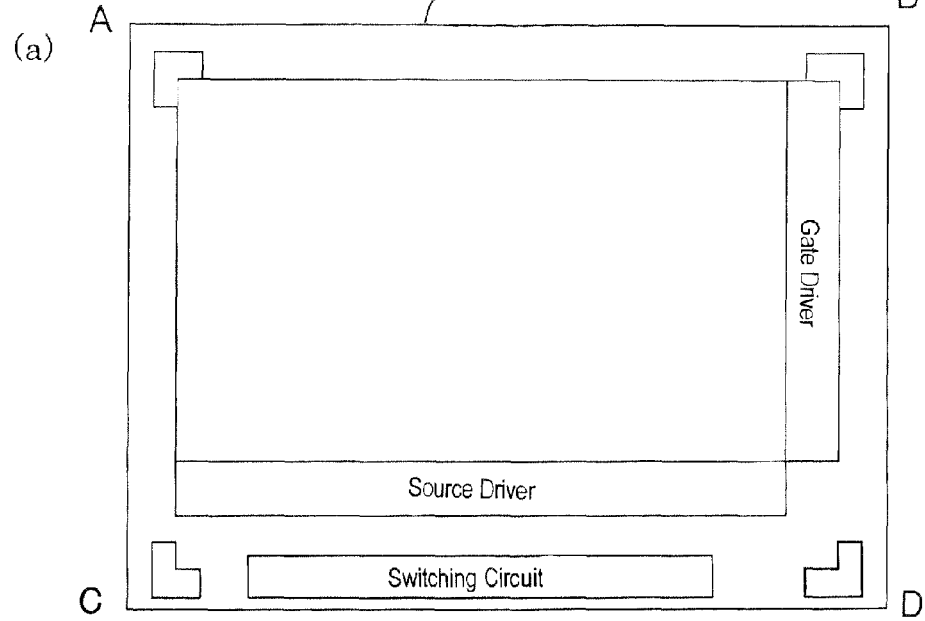
FIG. 5(*a*) is a plan view illustrating an active-matrix substrate for use in the first embodiment, FIG. 5(*b*) shows a configuration for a switching circuit, and FIG. 5(*c*) is a waveform diagram showing how the voltage applied to the counter conductive film changes with time.
Figure 5:
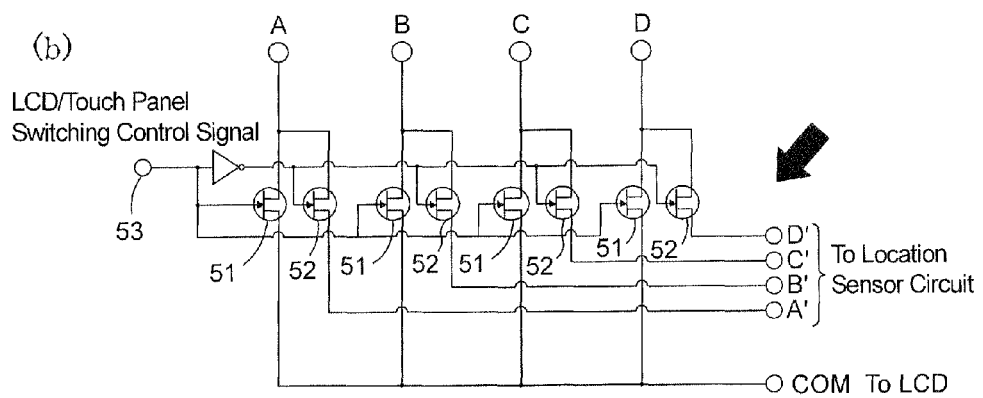
Figure 5:
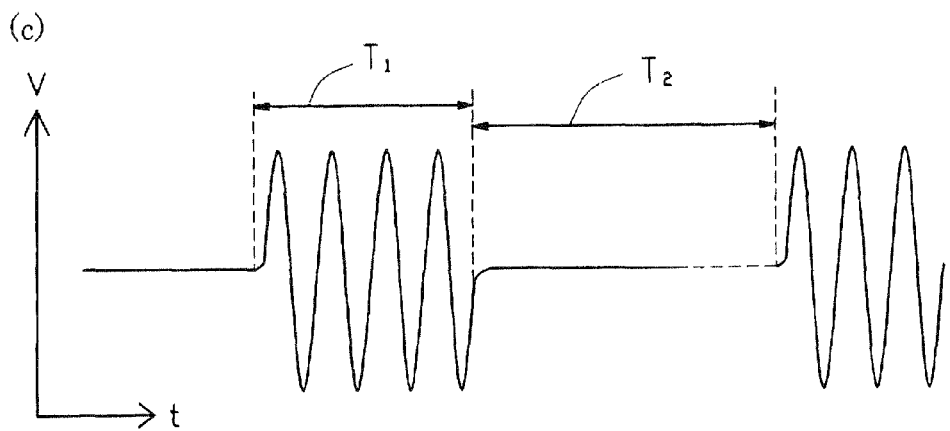

For that reason, in this preferred embodiment, the switching circuit, as well as the driver circuits, is provided on the active-matrix substrate 4A including the TFT array thereon as shown in FIG. 5(a). The transparent counter electrode 7 and electrodes A through D are provided on the counter substrate (not shown). Conductive members (which are also identified by A, B, C and D in FIG. 5(a)) to be connected to the electrodes A through D, respectively, are provided on the active-matrix substrate 4A. These conductive members are electrically connected to the electrodes A through D on the counter substrate. This connection may be done as in the connection between the transparent counter electrode 7 on the counter substrate and the display circuits on the active-matrix substrate 4A in a conventional display device.

FIG. 5(b) is a circuit diagram showing a configuration for the switching circuit. A signal to control the switching of the switching circuit is supplied to a terminal 53. This control signal is generated by a control circuit (not shown). While the control signal has "High" level, transistors 51 of a first type in the switching circuit are ON, while the other transistors 52 are OFF. In this case, the electrodes A through D are electrically connected to a common electrode COM in a liquid crystal display circuit so as to be supplied with a voltage required for display operations.

On the other hand, when the control signal changes from "High" level into "Low" level, the transistors 51 in the switching circuit are turned OFF, while the transistors 52 are turned ON. As a result, the electrodes A, B, C and D are respectively connected electrically to terminals A', B', C' and D' of the location sensor circuit. Then, the amounts of the currents $i_1$ through $i_4$ are measured and the location coordinates of are detected.

FIG. 5(c) shows how the potential level of the transparent counter electrode 7 changes with time. In FIG. 5(c), the ordinate represents the potential level of the transparent counter electrode 7 and the abscissa represents the time. A location sensing mode (period $T_1$) and a display mode (period $T_2$) are periodically alternated by the switching circuit. In the display mode, the four corners of the transparent counter electrode 7 are all electrically short-circuited and a potential needed to drive the liquid crystal (i.e., the common voltage COM) is supplied to the transparent counter electrode 7. In the location sensing mode on the other hand, the electrodes A through D at the four corners of the transparent counter electrode 7 are connected to the location sensor circuit by the switching circuit made up of transistors, diodes and so on.

In a liquid crystal display device with a normal configuration, the location sensing mode preferably has a period $T_1$ of 0.2 ms or more. The location sensing is carried out at a sample period of $(T_1+T_2)$. Accordingly, if the period of $(T_1+T_2)$ is too long and if the point of finer or pen contact is quickly shifted on the display plane, then the location coordinates to be detected consecutively with the shifts will be detected at excessively long intervals. To avoid such a problem, $T_1+T_2$ is preferably set equal to or smaller than 17 ms.

Also, the alternating current voltage to be applied to the transparent counter electrode 7 in the location sensing mode may have a frequency of 30 kHz to 200 kHz, for example, and an amplitude of 2 V to 3 V, for example. A DC bias voltage of 1 V to 2 V may be added to this alternating current voltage. Furthermore, the common voltage for display operations does not have to be fixed at a constant value but may have its polarity inverted for each field of the image to be displayed.

Although not shown in FIG. 5(a), the transistors making up the location sensor circuit, as well as the transistors making up the driver and switching circuits, are preferably provided on the active-matrix substrate 4A. This is because if these circuits are integrated together on the same substrate, then the signal waveforms are much less likely to be disturbed due to signal propagation delays and the resultant display quality is not deteriorated by the switching operations so easily.

Next, a configuration for the location sensor circuit 50 will be described with reference to FIG. 6.

Figure 6:
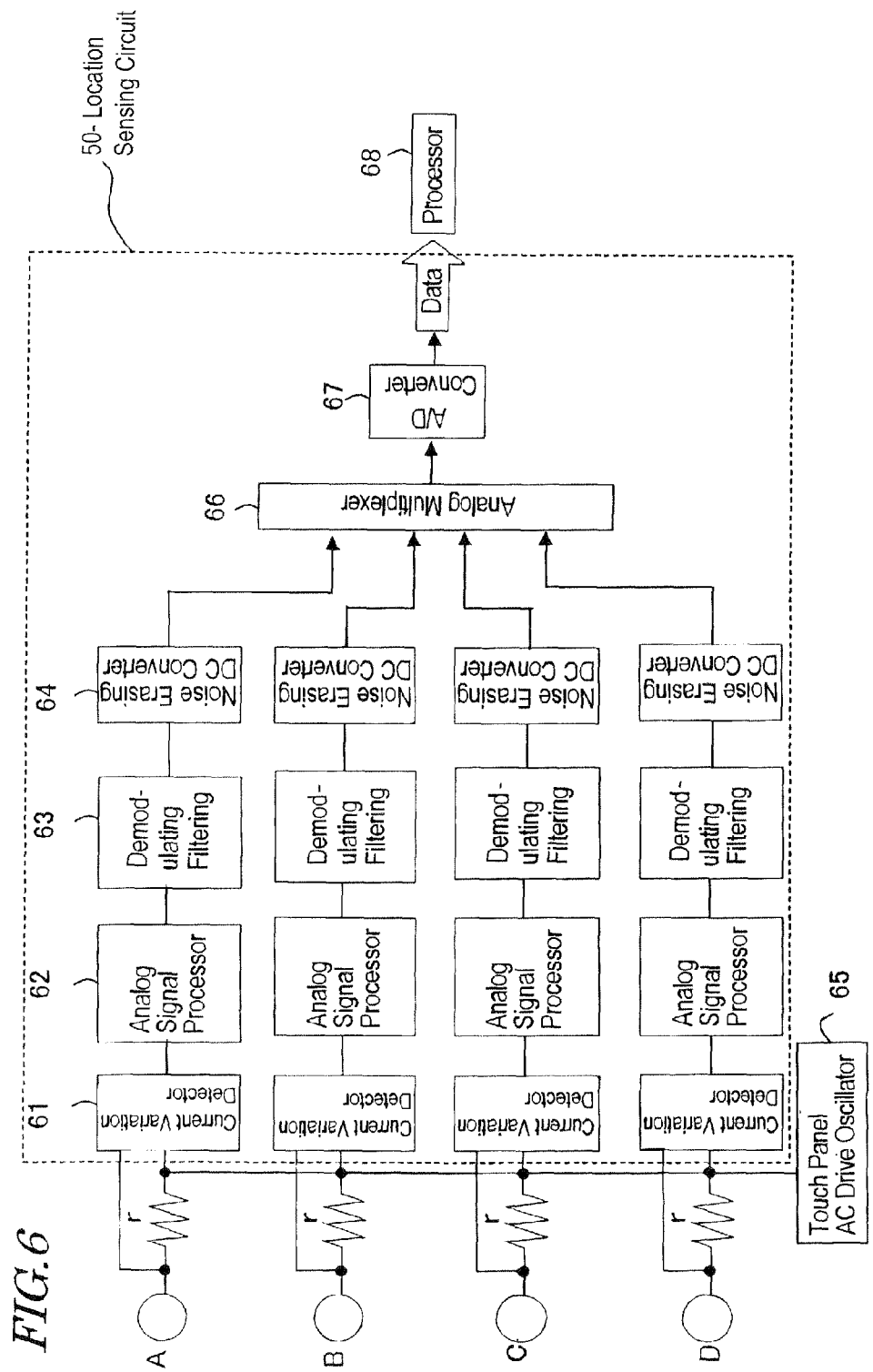
FIG. 6 is a block diagram of a location sensor circuit for use in the first embodiment.

The location sensor circuit 50 shown in FIG. 6 includes four current variation detector circuits 61. Each of the current variation detector circuits 61 measures the amount of current flowing between an associated one of the electrodes A through D in the transparent counter electrode and the ground in the location sensing mode. An alternating current voltage is applied from a touch sensor AC drive oscillator circuit 65 to the respective electrodes A through D. Accordingly, the currents flowing through the respective electrodes A through D responsive to a finger contact, for example, have AC components. The output of each current variation detector circuit 61 is subjected by its associated analog signal processor circuit 62 to amplification and band-pass filtering processes. Then, the output of each analog signal processor circuit 62 is demodulated by its associated demodulating filtering circuit 63 and then input to its associated noise erasing DC converter circuit 64. The noise erasing DC converter circuit 64 converts the output of its associated demodulating filtering circuit 63 into a direct current, thereby generating a signal having a value that is proportional to the amount of current flowing through its associated electrode A, B, C or D.

On receiving those signals from the noise erasing DC converter circuits 64, an analog multiplexer 66 switches these signals and then passes the outputs of the electrodes A through D in this order to an A/D converter 67. In response, the A/D converter 67 supplies a digitized signal (or data) to a processor 68.

The processor 68 is built in a personal digital assistant (PDA), an ATM, a ticket vending machine or any of various types of computers including the display device shown in FIG. 1 so as to carry out data processing.

The location data to be generated by the sensor circuit 50 is not limited to the example described above. Alternatively, the sensor circuit 50 may obtain the X and Y coordinates based on the digitized DC voltage values and output them as the location data.

Not all of the various circuits included in the location sensor circuit have to be provided on the active-matrix substrate. However, at least the circuit shown in FIG. 5(b), including the transistors 51 and 52, and the TFT array are preferably integrated together on the same active-matrix substrate.

In the display device with a touch sensor according to this embodiment, the transparent counter electrode, which is one of the components of the display device, also functions as a location sensing transparent conductive film. Accordingly, there is no need to separately provide a touch sensor, including a location sensing transparent conductive film, on a substrate of glass, for example, such that the touch sensor overlaps with the image display plane of the display panel. As a result, the conventional problem that the display quality deteriorates in terms of transmittance and reflectance due to the presence of the substrate for the touch sensor can be resolved.

In the preferred embodiment described above, however, the electrodes located on the inner surfaces of the two substrates 4 and 9 are used for location sensing. Accordingly, the distance from the point of finger or pen contact to the conductive film tends to be longer than the conventional one. The longer the distance, the lower the location sensitivity tends to be. To avoid such a decrease in sensitivity, the thickness of the counter substrate 9 is preferably decreased. The counter substrate 9 preferably has a thickness of 0.4 mm to 0.7 mm.

Figure 7:
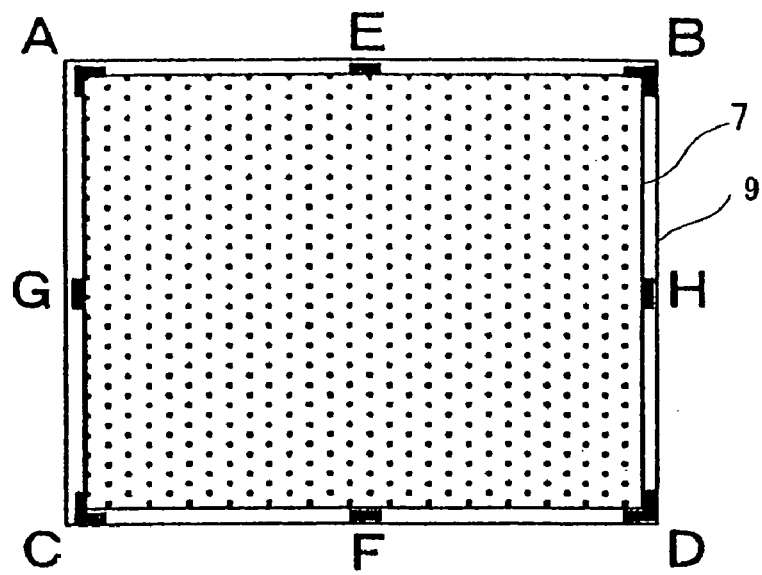
FIG. 7 is a plan view showing an exemplary arrangement of electrodes on a counter conductive film for use in a modified example of the first embodiment.

In the display device of this preferred embodiment, the location sensing electrodes do not have to be provided at the four corners of the transparent counter electrode. Optionally, additional electrodes E, F, G and H may also be provided between the electrodes A and B and between the electrodes C and D as shown in FIG. 7. If such a large number of electrodes are provided, the location sensing accuracy can be increased by getting the location sensing done with the three electrodes C, D and E immediately after the location sensing has been done with the three electrodes A, B and F, for example.

Figure 8:
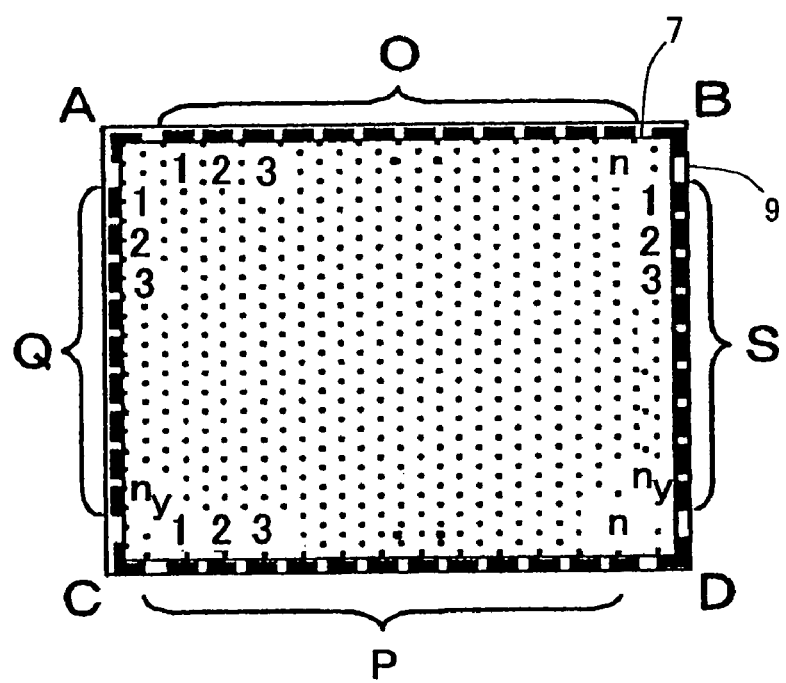
FIG. 8 is a plan view showing an exemplary arrangement of electrodes on a counter conductive film.

Alternatively, multiple subdivided electrodes $O_1$ through $O_{nx}$, $P_1$ through $P_{nx}$, $Q_1$ through $Q_{ny}$ and $S_1$ through $S_{ny}$ are preferably provided between the electrodes at the four corners (where nx and ny are each a natural number which is equal to or greater than two) as shown in FIG. 8. An electrode $O_j$ (where $1 \leq j \leq nx$) included in the subdivided electrodes $O_1$ through $O_{nx}$ between the electrodes A and B is associated with an electrode $P_j$ included in the subdivided electrodes $P_1$ through $P_{nx}$ between the electrodes C and D. Then, the amounts of currents flowing through the associated pair of electrodes $O_j$ and $P_j$ are measured while j is scanned from 1 through nx. In this manner, the X and Y coordinates of the point of contact can be obtained with high precision. The number of electrodes to be provided on each side of the transparent counter electrode 7 may be from 4 to 7, for example.

According to the electrostatic capacitive coupling technique adopted in this preferred embodiment, the estimated point of contact, calculated based on the amounts of currents flowing through the electrodes at the four corners, might be slightly different from the actual point of contact. However, by obtaining the values of currents flowing through the respective electrodes while scanning the huge number of electrodes provided at a lot of points, the sensing can be done highly precisely.

As the number of electrodes increases in this manner, the degree of interconnection complexity among the driver circuits, location sensor circuit and switching circuit increases exponentially. However, if the switching elements, location sensor circuit and driver circuits are integrated together on the same substrate, then there is no need to interconnect these circuits together by way of a large number of connection terminals and long wires. As a result, the deterioration in image quality due to signal propagation delay can be minimized.

Figure 9:
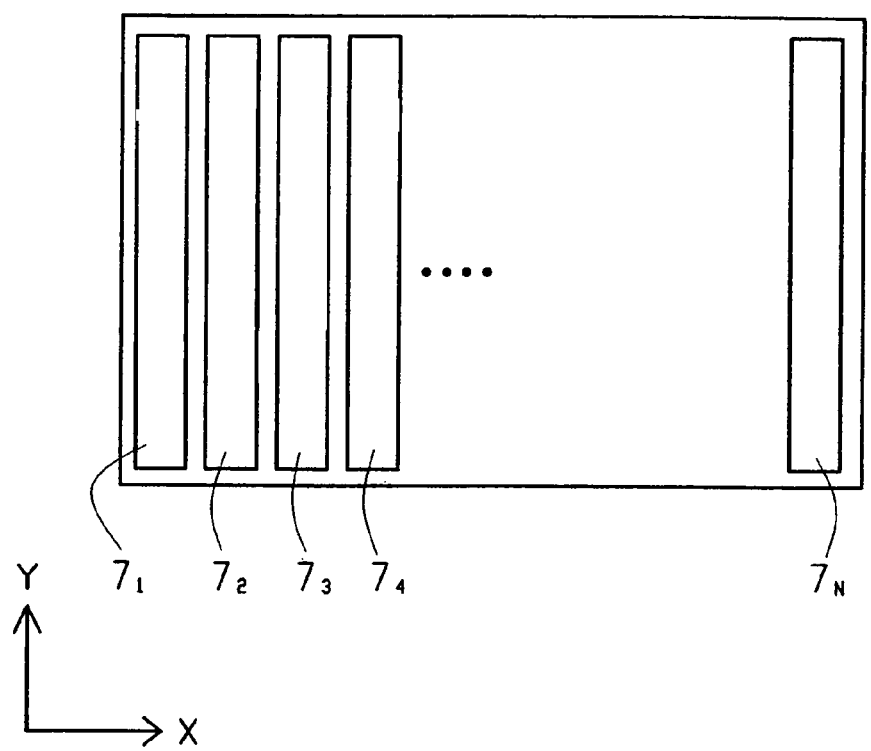
FIG. 9 is a plan view showing another configuration for a counter conductive film.

In the preferred embodiment described above, the transparent counter electrode 7 consists of a single transparent conductive film. However, the transparent counter electrode 7 of this preferred embodiment does not have to be such a single continuous film. Alternatively, the transparent counter electrode 7 may also be broken down into multiple subdivisions $7_1$ through $7_N$, for example, as shown in FIG. 9. In that case, each of those subdivisions $7_1$ through $7_N$ will have a pair of electrodes. By adopting such a configuration, the arrangement of multiple one-dimensional resistive bodies such as that shown in FIG. 2 can be obtained. Then, the location sensing about the Y coordinate will be done based on the amount of current flowing between a pair of electrodes provided for each subdivision. On the other hand, the location sensing about the X coordinate will be done by detecting at which subdivision the amount of current flowing has changed. In the example illustrated in FIG. 9, the greater the total number N of subdivisions $7_1$ through $7_N$ of the transparent counter electrode 7, the higher the location resolution of the X coordinate will be. Each subdivision may have a size of 63.5 µm to 254 µm, for example, as measured along the X-axis. A preferred N value range will be 240 through 480 when represented by the number of display dots of a PDA, for example.

This preferred embodiment is particularly effective when applied to a display device including an active-matrix substrate. However, the applications of this preferred embodiment are not limited thereto. Alternatively, this preferred embodiment is also applicable for use in a simple-matrix-addressed display device.

Figure 10:
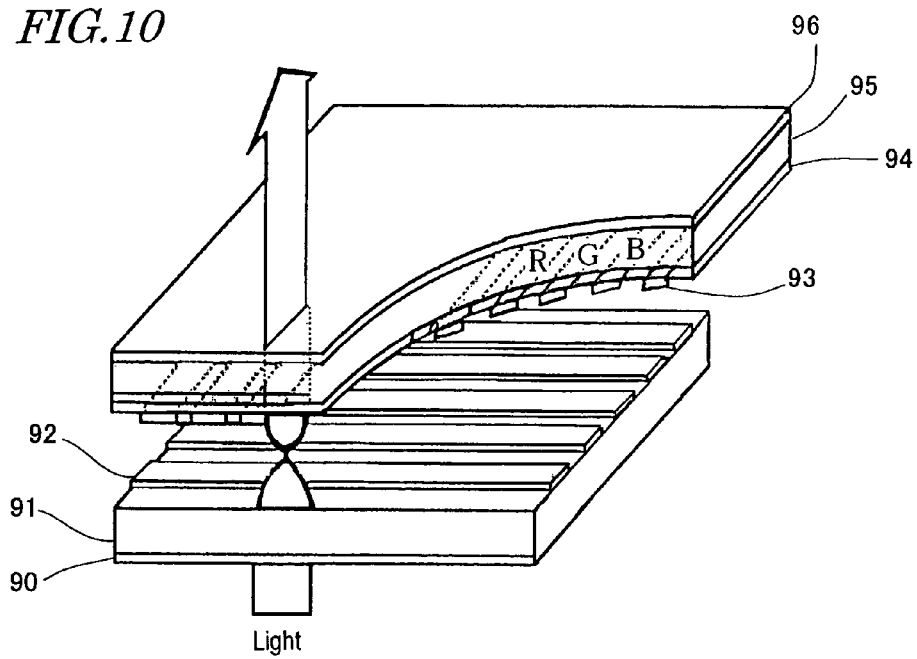
FIG. 10 is a perspective view showing a configuration for a display device to be operated by simple matrix addressing.

FIG. 10 schematically shows a configuration for a display device to be driven by a simple-matrix addressing technique. In this display device, a liquid crystal layer (not shown) is sandwiched between a first substrate 91, to which a polarizer phase plate 90 is attached on the back surface thereof, and a second substrate 95, to which a polarizer phase plate 96 is also attached on the back surface thereof.

On the inside surface of the first substrate 91, striped scanning electrodes 92 extending in the X-axis direction are arranged so as to face the liquid crystal layer. On the inside surface of the second substrate 95 on the other hand, a color filter portion 94 and striped scanning electrodes 93, extending in the Y-axis direction, are stacked in this order so as to face the liquid crystal layer, too. These two groups of electrodes 92 and 93 are arranged so as to cross each other. And an alignment film is deposited on each group of electrodes.

In the display device shown in FIG. 10, the scanning electrodes 92 or the data electrodes 93 are formed by patterning a transparent conductive film. Thus, the scanning electrodes 92 or the data electrodes 93 will function as a location sensing conductive film. The voltage to be applied to the scanning electrodes 92 or data electrodes 93 is controlled by a driver/location sensor circuit to be switched by a circuit similar to the switching circuit described above.

Figure 11:
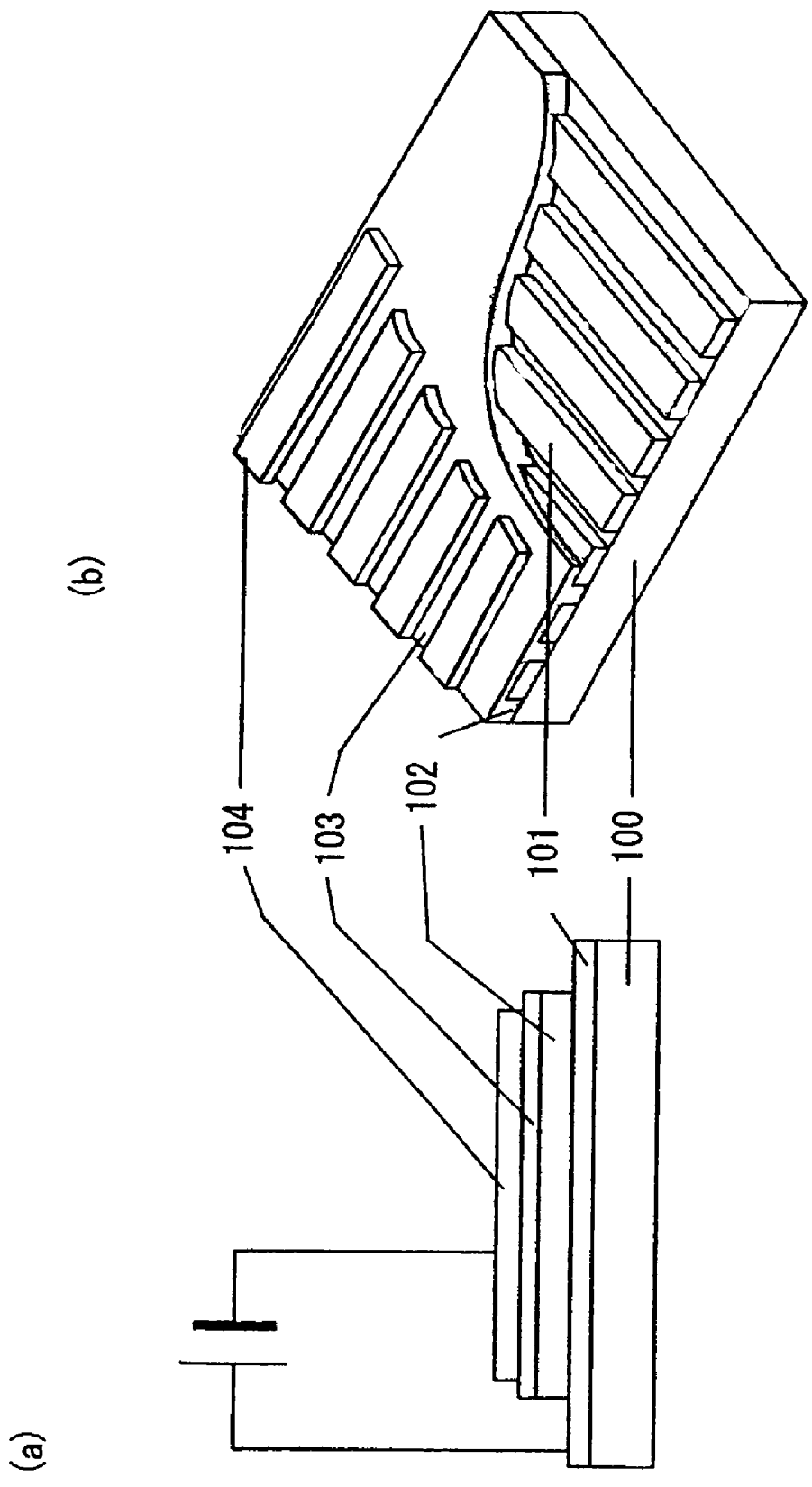
FIGS. 11(*a*) and 11(*b*) are respectively a cross-sectional view and a perspective view showing a basic configuration for an organic EL display device.

As another alternative, this preferred embodiment is applicable to not just a liquid crystal display device but also to other devices such as an organic EL device. FIGS. 11(a) and 11(b) show an exemplary configuration for an organic EL device. In this display device, transparent electrodes 101, an organic hole transporting layer 102, an organic EL layer 103 and metal electrodes 104 are stacked in this order on a glass substrate 100. The transparent electrodes 101 and metal electrodes 104 are arranged in stripes so as to cross each other. The light produced in the organic EL layer 103 is emitted downward through the glass substrate 100.

In this embodiment, contact is made with a finger or a pen on the back surface of the glass substrate 100 (i.e., the front side of the display device). And a location sensing transparent conductive film that has been divided into multiple stripes, i.e., the transparent electrodes 101, is used for location sensing purposes.

The voltage being applied to the transparent electrodes 101 is controlled by a driver/location sensor circuit to be switched by a circuit similar to the switching circuit described above.

As described above, the display device with a touch sensor according to this first preferred embodiment can check the decrease in the transmittance of light going out of a display panel and minimize the deterioration of the resultant display quality. Furthermore, the increase in the thickness or weight of the overall device can also be minimized.

EMBODIMENT 2

Hereinafter, a touch sensor according to another embodiment of the present invention will be described with reference to FIGS. 12 and 13.

A touch sensor 37 according to this second preferred embodiment detects an external input point on a two-dimensional operating plane (i.e., extending in X and Y directions) by an electrostatic capacitive coupling technique. In the following preferred embodiment, a situation where an input point is defined by touching the operating plane with a finger or an electrically conductive pen, for example, will be described. FIG. 12 is a perspective view schematically illustrating a configuration for the touch sensor 37.

Figure 12:
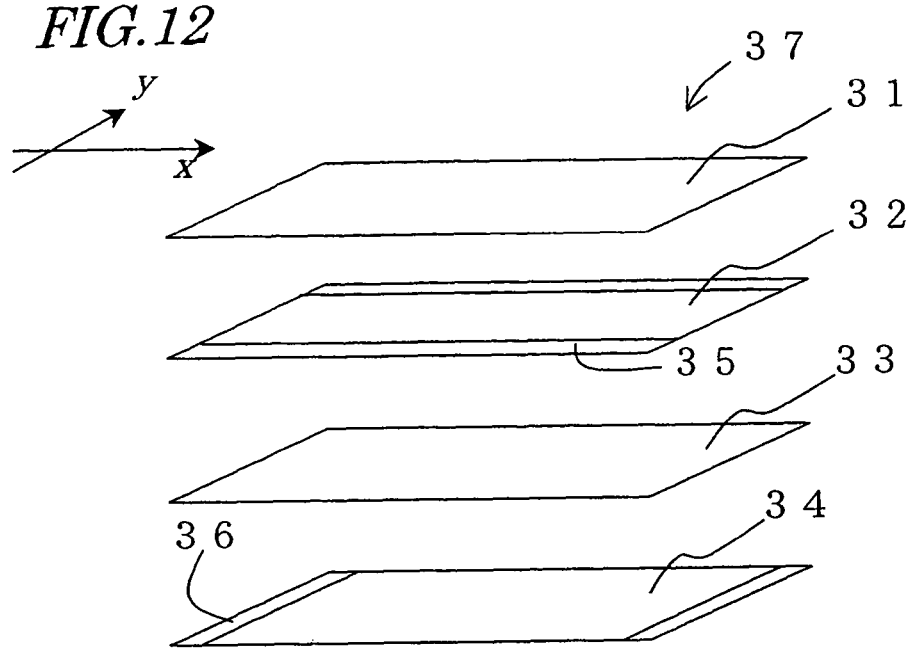
FIG. 12 is a perspective view schematically illustrating the structure of a touch sensor according to a second embodiment.

As shown in FIG. 12, the touch sensor 37 includes: two location sensing transparent conductive films (or transparent resistive films), i.e., a first location sensing transparent conductive film 32 arranged parallel to the operating plane and a second location sensing transparent conductive film 34 arranged so as to face the first location sensing transparent conductive film 32; a dielectric layer 33 interposed between these location sensing transparent conductive films 32 and 34;

and a switching circuit (not shown). The dielectric layer 33 is made of an electrically insulating material.

Also, if necessary, glass 31 may be further provided on the opposite side of the first location sensing transparent conductive film 32 (i.e., so as not to face the dielectric layer 33). By providing the glass 31 in this manner, it is possible to avoid the situation where some damage is done on the touch sensor 37 due to direct contact of a finger or conductive pen with the operating plane of the touch sensor 37. In addition, the reflectance can also be reduced as well. In the touch sensor 37 shown in FIG. 12, the principal surface of the glass 31 is used as the operating plane and a point of contact is defined for the touch sensor 37 when contact is made on this operating plane with a finger or a pen.

Figure 13:
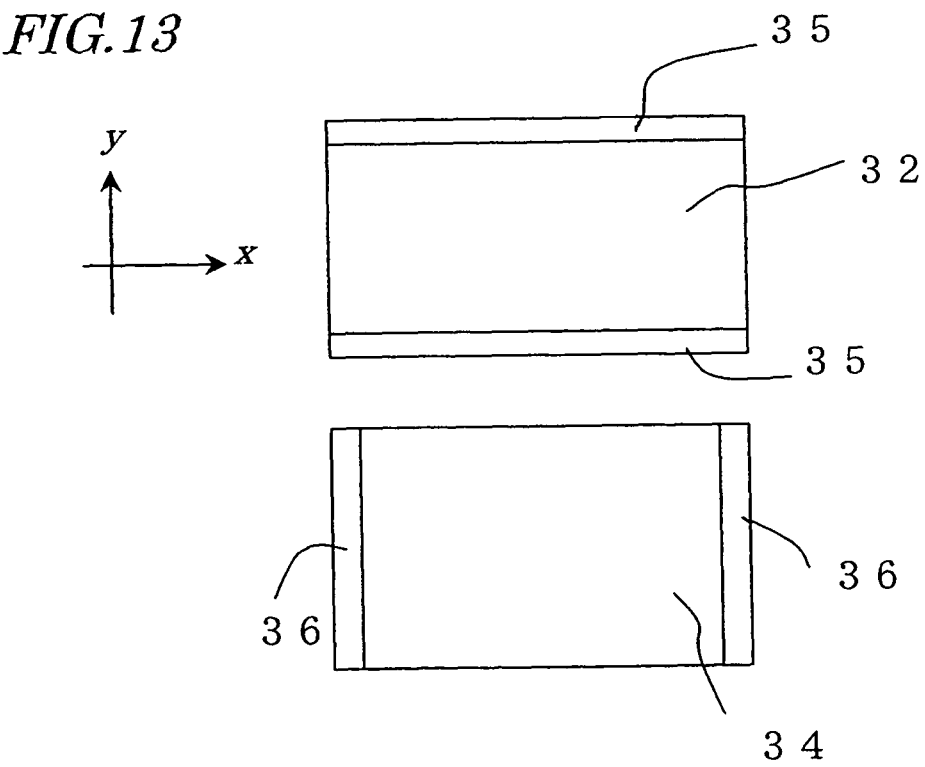
FIG. 13 is a plan view schematically showing the first and second transparent conductive films shown in FIG. 12.

As shown in FIG. 13, each of the first and second location sensing transparent conductive films 32 and 34 includes conductive portions (conductive film pattern) for detecting the coordinates of the point of contact. The conductive portions function as electrodes for applying a predetermined voltage to the location sensing transparent conductive film. Also, these conductive portions may be formed by patterning a metal film, for example.

The conductive portions provided for the first location sensing transparent conductive film 32 are Y coordinate detecting conductive portions 35 for detecting the Y coordinate of the point of contact. These Y coordinate detecting conductive portions 35 are provided in two separate regions of the first location sensing transparent conductive film 32, which are spaced apart from each other in the Y direction. On the other hand, the conductive portions provided for the second location sensing transparent conductive film 34 are X coordinate detecting conductive portions 36 for detecting the X coordinate of the point of contact. These X coordinate detecting conductive portions 36 are provided in two separate regions of the second location sensing transparent conductive film 34, which are spaced apart from each other in the X direction.

It should be noted that the "X direction" or "Y direction" does not necessarily herein mean a direction defined by a straight line in a strict sense. For example, if the touch sensor or display panel is made of a flexible material, then the operating plane may be curved. However, even if the operating plane is actually not a plane but such a curved surface, any location on the operating plane can still be represented by X and Y coordinates.

Figure 23:
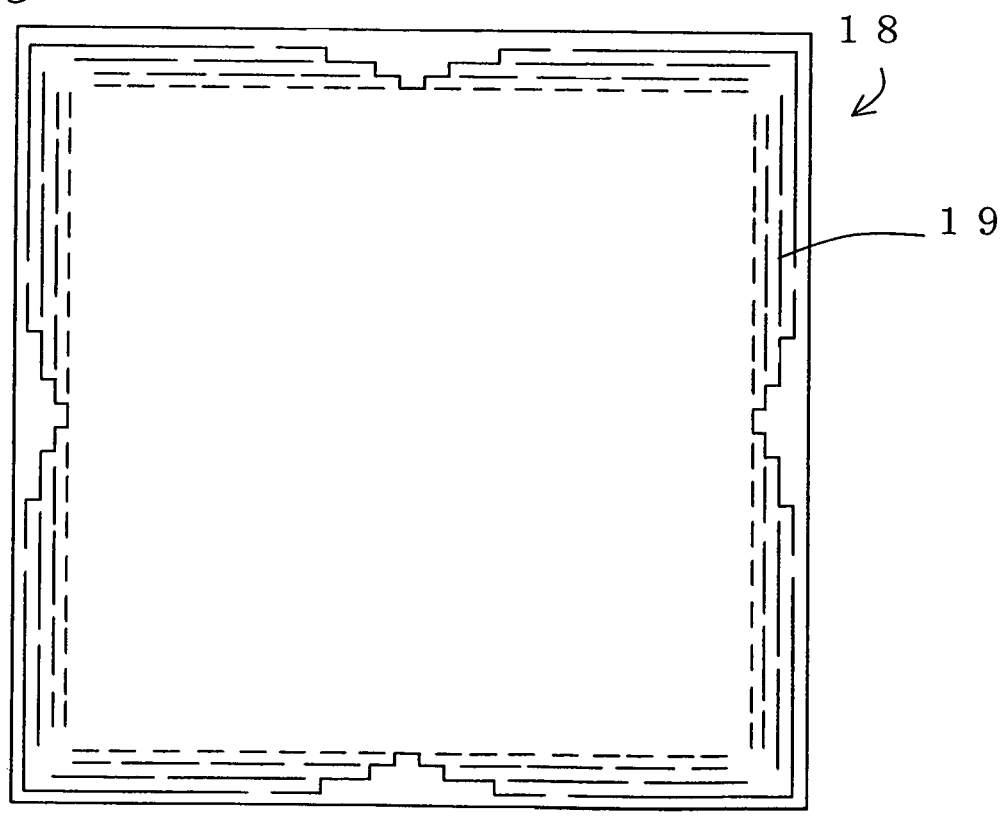
FIG. 23 is a plan view schematically illustrating a transparent resistive film of a conventional touch sensor of an analog electrostatic capacitance type.

As shown in FIG. 13, the Y coordinate detecting conductive portions 35 and X coordinate detecting conductive portions 36 have a simple pattern just like the conductive portion 19 of a touch sensor of a normal analog resistive film type. The pattern of these conductive portions 35 and 36 is simpler than that of the conductive portion 19 of a conventional touch sensor of an analog electrostatic capacitive coupling type as shown in FIG. 23.

As described above, the touch sensor 37 of this preferred embodiment includes the two location sensing transparent conductive films 32 and 34. The Y coordinate detecting conductive portions 35 are provided for one of two location sensing transparent conductive films 32 and 34 and the X coordinate detecting conductive portions 36 are provided for the other location sensing transparent conductive film 34. And the Y coordinate detecting conductive portions 35 and X coordinate detecting conductive portions 36 each have a simple conductive pattern.

Furthermore, these Y coordinate detecting conductive portions 35 and X coordinate detecting conductive portions 36 are connected to a switching circuit (not shown). By turning the switching circuit, an alternating current voltage is selectively applied to either the Y coordinate detecting conductive portions 35 or the X coordinate detecting conductive portions 36. The Y coordinate detecting conductive portions 35 are electrically connected to the first location sensing transparent conductive film 32 and the X coordinate detecting conductive portions 36 are electrically connected to the second location sensing transparent conductive film 34. Accordingly, by turning the switching circuit, one of the first and second location sensing transparent conductive films 32 and 34 becomes electrically conductive and generates an electric field substantially uniformly.

Hereinafter, it will be described how the touch sensor 37 of this preferred embodiment senses the location.

Suppose the surface of the glass 31 is touched with an electrically conductive pen or a finger while a voltage is being selectively applied to the Y coordinate detecting conductive portions 35, not the X coordinate detecting conductive portions 36. Then, the first location sensing transparent conductive film 32 is capacitively coupled to the ground (or grounded plane). In this case, no voltage is applied to the X coordinate detecting conductive portions 36.

In this case, the capacitance created is the sum of the capacitance between the glass 31 and the first location sensing transparent conductive film 32 and the capacitance between the person and the ground. The value of the electrical resistance between the point of contact and the Y coordinate detecting conductive portions 35 of the first location sensing transparent conductive film 32, which are capacitively coupled together, is proportional to the distance from the point of contact to the Y coordinate detecting conductive portions 35. Accordingly, current flows through the Y coordinate detecting conductive portions 35 in an amount that is proportional to the distance between the point of contact and the Y coordinate detecting conductive portions 35. Thus, by detecting the amount of this current, the Y coordinate of the point of contact can be obtained.

To obtain the X coordinate of the point of contact, a voltage is selectively applied to the X coordinate detecting conductive portions 36 by turning the switching circuit. In this case, no voltage is applied to the Y coordinate detecting conductive portions 35. As a result, the second location sensing transparent conductive film 34 is capacitively coupled to the ground (grounded plane).

In this case, the capacitance created is the sum of the capacitance between the glass 31 and the second location sensing transparent conductive film 34 and the capacitance between the person and the ground. Current flows through the X coordinate detecting conductive portions 36 in an amount that is proportional to the distance between the point of contact and the X coordinate detecting conductive portions 36. Thus, by detecting the amount of this current, the X coordinate of the point of contact can be obtained. In this manner, the Y and X coordinates of the point of contact can be obtained.

In the coordinate detecting method described above, the Y and X coordinates of the point of contact are detected separately and it seems like taking a longer time to get the detection done than a conventional method in which the Y and X coordinates of the point of contact are supposed to be detected at the same time. However, it takes just a matter of several milliseconds to detect each of these coordinates. For that reason, the total time it takes to detect the Y and X coordinates is sufficiently shorter than the time it takes for the person to complete his or her touching operation, thus causing no problem at all.

The change of connection to be performed by the switching circuit has a frequency of about several hundreds kHz.

Accordingly, even if the point of contact is shifting on the operating plane, the point of contact on the move can also be continuously located almost in real time. Optionally, if the location coordinates detected are stored in a memory, for example, then the touch sensor 37 may be used as a handwriting input device.

The location sensing method by the electrostatic capacitive coupling technique for use in this second preferred embodiment has the same basic principle as already described for the first preferred embodiment with reference to FIG. 2, and the detailed description thereof will be omitted herein. In the touch sensor 37 of this second preferred embodiment, the location sensing transparent conductive film 32 or 34 with a two-dimensional extent performs the same function as the one-dimensional resistive body shown in FIG. 2. Also, the pair of Y coordinate detecting conductive portions 35 functions just as the electrodes A and B and the pair of X coordinate detecting conductive portions 36 also functions just as the electrodes A and B. A current-voltage converting resistor is connected to each of the two electrodes A and B. These electrodes A and B are connected to a location sensor circuit to be described later.

An (alternating current e) voltage with the same phase and same potential is applied between the electrode A and the ground and between the electrode B and the ground. In this case, the electrodes A and B are always at the same potential level, and therefore, no current flows between the electrodes A and B.

Suppose the resistance between the point C of contact and the electrode A is $R_1$, the resistance between the point C of contact and the electrode B is $R_2$ and $R=R_1+R_2$. Then, $R_1/R$ can be obtained by Equations (1) through (8) as described for the first preferred embodiment.

In the touch sensor 37 of this preferred embodiment, the principle described above is applied to the first and second location sensing transparent conductive films 32 and 34. Specifically, if a voltage is selectively applied by the switching circuit to the first location sensing transparent conductive film 32, then the Y coordinate ($R_1/R$) is detected by measuring the amounts of currents flowing through the pair of Y coordinate detecting conductive portions 35 of the first location sensing transparent conductive film 32. On the other hand, if a voltage is selectively applied by the switching circuit to the second location sensing transparent conductive film 34, then the X coordinate ($R_1/R$) is detected by measuring the amounts of currents flowing through the pair of X coordinate detecting conductive portions 36 of the second location sensing transparent conductive film 34. In this manner, the coordinates (i.e., X and Y coordinates) of the point of contact can be obtained.

As described above, the touch sensor 37 of this preferred embodiment includes the two location sensing transparent conductive films 32 and 34, the Y coordinate detecting conductive portions 35 are provided for one of the two location sensing transparent conductive films, and the X coordinate detecting conductive portions 36 are provided for the other location sensing transparent conductive film. Accordingly, as compared with a conventional touch sensor including just one location sensing transparent conductive film which is provided with conductive portions for detecting the Y and X coordinates, the pattern of the coordinate detecting conductive portions can be simplified. That is to say, the area to be allocated to the coordinate detecting conductive portions can be narrowed on each location sensing transparent conductive film. As a result, the point-of-contact sensible area can be expanded on the operating plane.

In addition, the switching circuit makes the first and second location sensing transparent conductive films 32 and 34 electrically conductive alternately, thereby detecting the Y coordinate and the X coordinate independently. Accordingly, the operation of detecting one coordinate is not affected by the operation of detecting the other coordinate. As a result, the location coordinates can be detected highly accurately.

In the touch sensor 37, the first and second location sensing transparent conductive films 32 and 44 are preferably made of a material that shows uniform low resistance on a plane, e.g., indium tin oxide (ITO). On the other hand, the dielectric layer 33 is preferably made of polyethylene terephthalate (PET) with a thickness of about 100 μm, for example. PET and ITO have similar refractive indices. Accordingly, no reflection occurs in the interface between the first location sensing transparent conductive film 32 and the dielectric layer 33 or in the interface between the second location sensing transparent conductive film 34 and the dielectric layer 33. Thus, the decrease in the transmittance of the touch sensor 37 can be minimized. Also, the dielectric layer 33 having the thickness described above can be electrically insulated between the first and second location sensing transparent conductive films 32 and 34 just as intended. It should be noted that the dielectric layer 33 does not have to be made of PET but may also be made of glass or any other transparent insulator of which the refractive index is almost equal to that of PET. The thickness of the dielectric layer 33 is appropriately determined by the material adopted.

Figure 22:
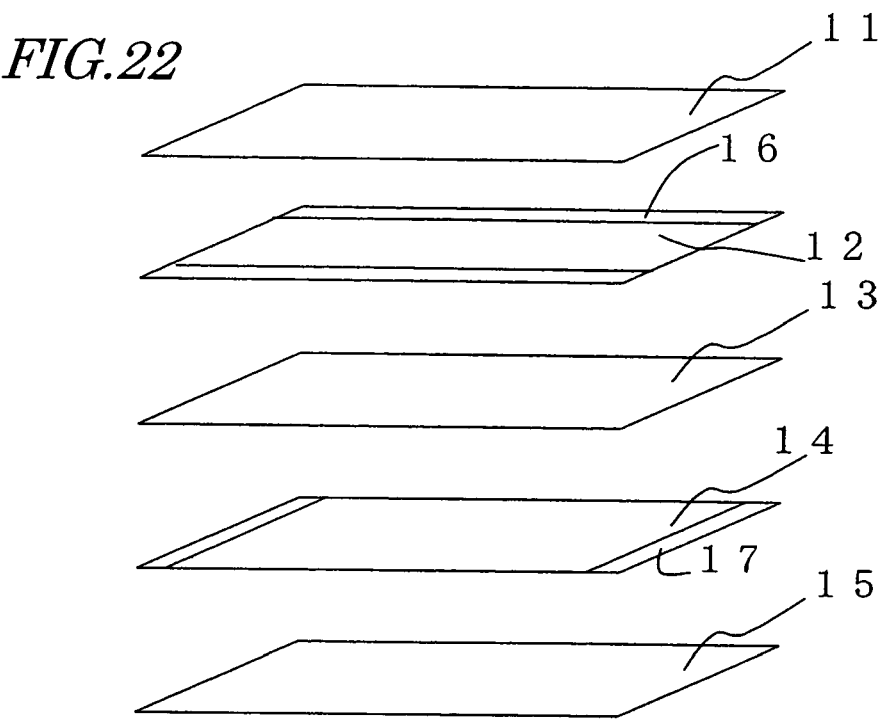
FIG. 22 is a perspective view schematically showing a normal touch sensor of an analog resistive film type.

As already described with reference to FIG. 22, a touch sensor of an analog resistive film type needs an air layer 13 between two transparent resistive films 12 and 14. Thus, the transmittance of the touch sensor decreases due to the difference in reflectance between the transparent resistive films 12, 14 and the air layer 13. In contrast, in the touch sensor 37 of the analog electrostatic capacitive coupling type according to this preferred embodiment, the dielectric layer 33 may be made of PET or any other material with a refractive index that is approximately equal to that ITO. For that reason, the decrease in transmittance can be much smaller than the touch sensor of the analog resistive film type.

Each of the location sensing transparent conductive films 32 and 34 and dielectric layer 33 described above may be made of the same material as the counterpart of a touch sensor of a normal analog resistive film type. Also, as already described with reference to FIG. 13, the pattern of the coordinate detecting conductive portions 35 or 36 in the touch sensor 37 is similar to that of the conductive portions in the conventional touch sensor of the normal analog resistive film type. Accordingly, in fabricating this touch sensor 37, the conventional apparatus and materials for fabricating the touch sensor of the analog resistive film type may also be used and the increase in manufacturing cost can be minimized.

Figure 14:
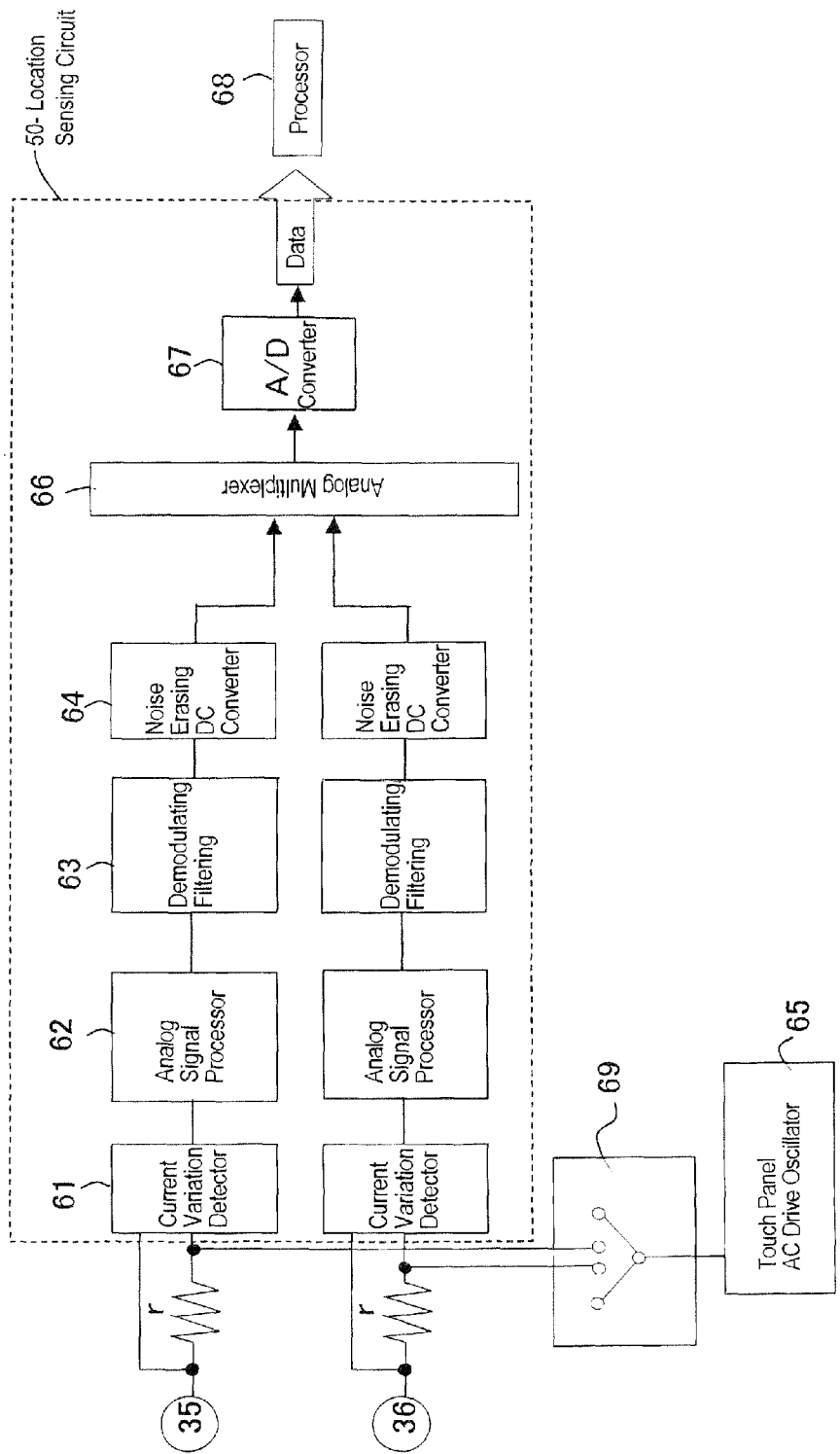
FIG. 14 is a block diagram of a location sensor circuit for use in the touch sensor of the second embodiment.

Hereinafter, an exemplary configuration for a location sensor circuit 50 to be provided for the touch sensor 37 will be described with reference to FIG. 14. In FIG. 14, two sets of circuits 61 through 64 are illustrated. However, the number of circuits of each type is not limited to the illustrated one. For example, if the first location sensing transparent conductive film 32 includes the pair of Y coordinate detecting conductive portions 35 and if the second location sensing transparent conductive film 34 includes the pair of X coordinate detecting conductive portions 36 as shown in FIG. 13, then the location sensor circuit 50 will include four sets of circuits 61 through 64 because each conductive portion is provided with one set of circuits 61 through 64.

The location sensor circuit 50 shown in FIG. 14 includes current variation detector circuits 61. The current variation detector circuits 61 measure the amount of currents flowing between the Y coordinate detecting conductive portions 35 of the first location sensing transparent conductive film 32 and the ground and the amount of currents flowing between the X coordinate detecting conductive portions 36 of the second location sensing transparent conductive film 34 and the ground. By turning the switching circuit 69, electrical continuity between the Y coordinate detecting conductive portions 35 and a touch sensor AC drive oscillator circuit 65 is switched into electrical continuity between the X coordinate detecting conductive portions 36 and the touch sensor AC drive oscillator, circuit 65, and vice versa. Accordingly, an alternating current voltage is selectively applied from the touch sensor AC drive oscillator circuit 65 to either the Y coordinate detecting conductive portions 35 or the X coordinate detecting conductive portions 36. Thus, the currents flowing through the respective conductive portions 35 and 36 responsive to a finger contact, for example, have AC components.

The output of each current variation detector circuit 61 is subjected by its associated analog signal processor circuit 62 to amplification and band-pass filtering processes. Then, the output of each analog signal processor circuit 62 is demodulated by its associated demodulating filtering circuit 63 and then input to its associated noise erasing DC converter circuit 64. The noise erasing DC converter circuit 64 converts the output of its associated demodulating filtering circuit 63 into a direct current, thereby generating a signal having a value that is proportional to the amount of current flowing through its associated conductive portion 35 or 36.

On receiving those signals from the noise erasing DC converter circuits 64, an analog multiplexer 66 switches these signals and then passes the outputs of the conductive portions 35 and 36 to an A/D converter 67. In response, the A/D converter 67 supplies a digitized signal (or data) to a processor 68.

Figure 16:
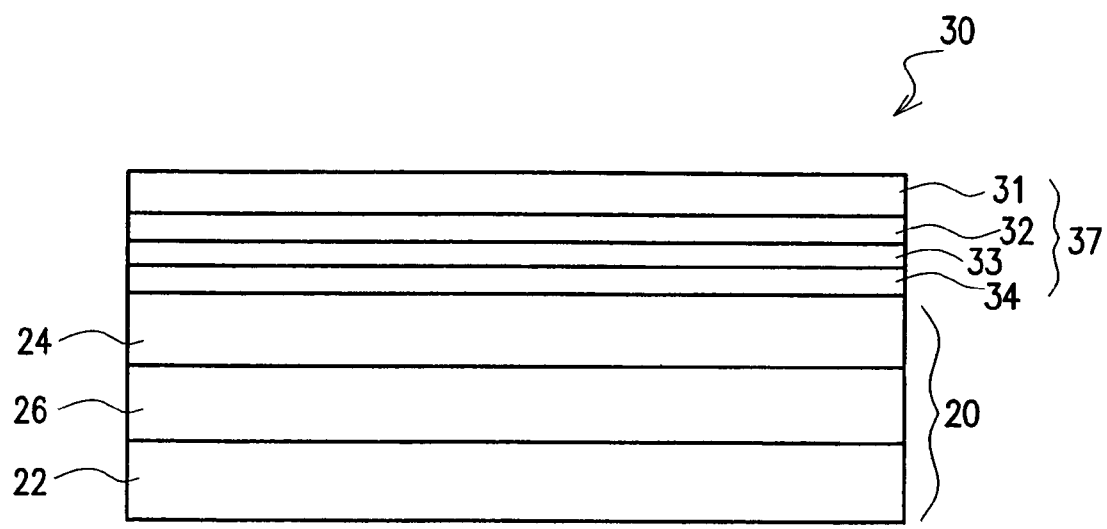
FIG. 16 is a schematic representation of a display device including the touch sensor of the second embodiment.

The processor 68 is built in a personal digital assistant (PDA), an ATM, a ticket vending machine or any of various types of computers including the display device shown in FIG. 16 so as to carry out data processing.

The location data to be generated by the sensor circuit 50 is not limited to the example described above. Alternatively, the sensor circuit 50 may obtain the X and Y coordinates based on the digitized DC voltage values and output them as the location data.

Figure 15:
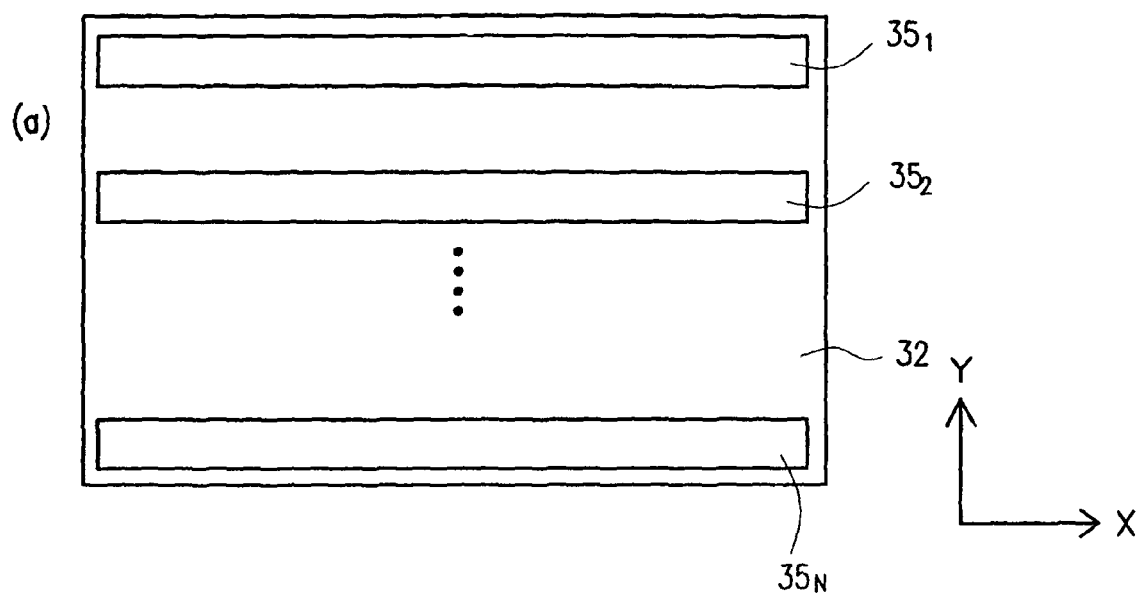
FIGS. 15(*a*) and 15(*b*) are plan views showing modified examples of the transparent conductive film.
Figure 15:
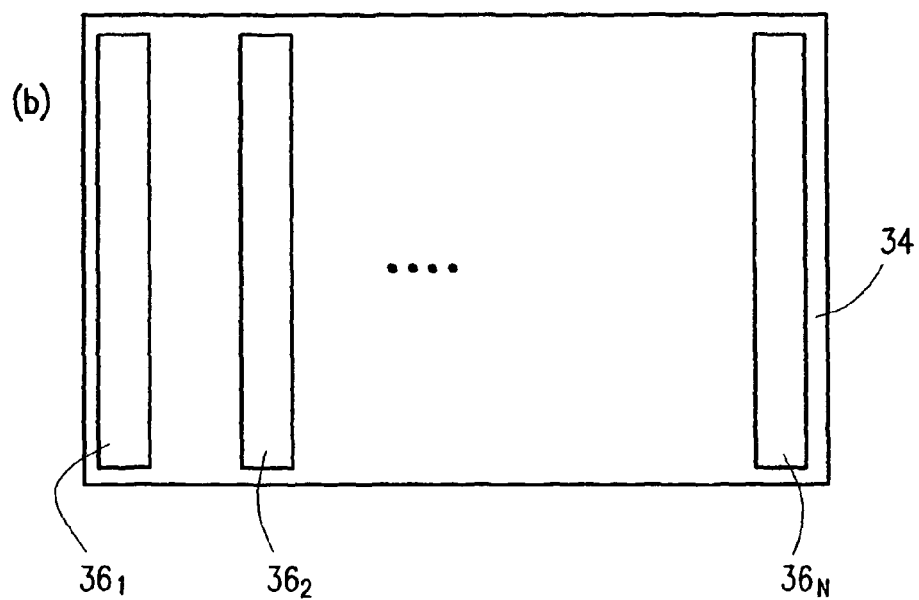

In the preferred embodiment described above, the first location sensing transparent conductive film 32 includes the pair of Y coordinate detecting conductive portions 35 and the second location sensing transparent conductive film 34 includes the pair of X coordinate detecting conductive portions 36. However, the conductive portions 35 and 36 to be provided for the location sensing transparent conductive films 32 and 34 of this preferred embodiment do not have to be arranged in that way. Alternatively, the Y coordinate detecting conductive portions 35 may also include three or more conductive portions $35_1$ through $35_N$, which are spaced apart from each other in the Y direction as shown in FIG. 15. In the same way, the X coordinate detecting conductive portions 36 may also include three or more conductive portions $36_1$ through $36_N$, which are spaced apart from each other in the X direction.

In that case, the pattern of the conductive portions 35 or 36 is more complicated than the pattern shown in FIG. 13. However, as there are a greater number of conductive portions provided, the point of contact can be located even more precisely. It should be noted that if the number of conductive portions provided is increased in this manner, the conductive portions to be arranged within the display area are preferably made of a transparent material.

In the touch sensor of the second preferred embodiment described above, even if the conductive pattern of the touch sensor is simpler than that of the conventional electrostatic capacitive coupling type touch sensor, the location sensing can still be carried out with high precision.

The touch sensor 37 of the second preferred embodiment described above is typically used so as to be attached to a display panel. FIG. 16 schematically illustrates a display device 30 including the touch sensor 37. The display device 30 is designed such that the touch sensor 37 is provided on the display plane of a display panel 20.

The display panel 20 includes an active matrix substrate 22 with a plurality of pixel electrodes that are arranged in matrix, a transparent counter substrate 24 facing this active matrix substrate 22, and a display medium layer 26 provided between these substrates. The transparent counter substrate 24 includes a transparent electrode, which is provided so as to face the pixel electrodes. The display panel 20 may be a liquid crystal display panel or an organic EL device, for example. If the display panel 20 is a liquid crystal display panel, the display medium layer 26 is a liquid crystal layer. On the other hand, if the display panel 20 is an organic EL device, then the display medium layer 26 is an organic EL layer.

Optionally, in this display device 30, either the first location sensing transparent conductive film 32 or the second location sensing transparent conductive film 34 of the touch sensor 37 may be used as the transparent electrode of the display panel 20. Then, one transparent conductive film can be cut down and the decrease in transmittance can be lessened. Hereinafter, a display device with a touch sensor, in which the second location sensing transparent conductive film 34 is used as the transparent counter electrode of the display panel 20, will be described.

Such a display device with a touch sensor includes an active matrix substrate 22, which is arranged so as to face the second location sensing transparent conductive film 34 with a display medium layer interposed between them. The display device with the touch sensor further includes: a first circuit for supplying a voltage or current to the second location sensing transparent conductive film 34 for display purposes while a predetermined voltage (which is a voltage for location sensing and is typically a periodically changing oscillating voltage) is not applied; a second circuit for detecting currents flowing from multiple points of the second transparent conductive film 34; and a switching circuit for selectively connecting electrically one of the first and second circuits to the second location sensing transparent conductive film 34.

This display device with the touch sensor uses the second location sensing transparent conductive film 34 as a transparent electrode, and includes not only a switching circuit for applying a predetermined voltage to a selected one of the first and second location sensing transparent conductive films 32 and 34 but also another switching circuit for electrically connecting one of the first and second circuits to the second location sensing transparent conductive film 34.

By getting one of the first and second circuits electrically connected to the second location sensing transparent conductive film 34 by way of the second switching circuit, the second location sensing transparent conductive film 34 can be used by a time sharing technique, thereby sometimes locating the point of contact and sometimes applying a display voltage. Accordingly, there is no need to provide any additional transparent electrode behind the touch sensor, thus minimizing the decrease in transmittance of the display device with the touch sensor. As a result, the size and weight of the display device with the touch sensor can be reduced.

If the touch sensor 37 of the second preferred embodiment is arranged on the front side (i.e., on the viewer side) of the display panel 20 such as an LCD panel as shown in FIG. 16, then the touch sensor 37 might be subject to noise coming from the display device 20 and have its location sensing accuracy decreased. The noise coming from the display panel 20 includes a voltage to be induced in the location sensing transparent conductive films 32 and 34 of the touch sensor 37 due to a common voltage applied to the counter electrode of the display panel 20.

To remove this noise, the sensor 50 for locating the point of contact in the display device with the touch sensor according to this second preferred embodiment calculates the point of contact after having subtracted a signal corresponding to the induced voltage from the detected signal.

Also, when the touch sensor 37 of the electrostatic capacitive coupling type is combined with the display panel 20 as is done in this second preferred embodiment, a shield layer (not shown) is preferably provided between the location sensing transparent conductive film 32 or 34 of the touch sensor 37 and the display panel 20, thereby preventing the touch sensor 37 from being affected by the noise coming out of the display panel 20. Furthermore, the location sensing transparent conductive film 32 or 34 of the touch sensor 37 is well spaced apart from the display panel 20 so as to minimize the effects of the noise coming out of the display panel 20.

However, if such a shield layer is provided between the touch sensor 37 and the display panel 20 and/or if the location sensing transparent conductive film of the touch sensor 37 is well spaced apart from the display panel 20, then parallax will increase unintentionally. Also, the transmittance of the object provided between the display plane of the display panel 20 and the viewer might decrease. Furthermore, the display device with the touch sensor 37 should have an increased size, thus making it difficult to reduce its thickness any further.

In order to overcome these problems, a display device with a touch sensor, which produces just a small parallax and can be downsized sufficiently, and a method of generating location data will be described.

EMBODIMENT 3

Hereinafter, a display device with a touch sensor according to another preferred embodiment of the present invention will be described with reference to FIG. 17.

Figure 17:
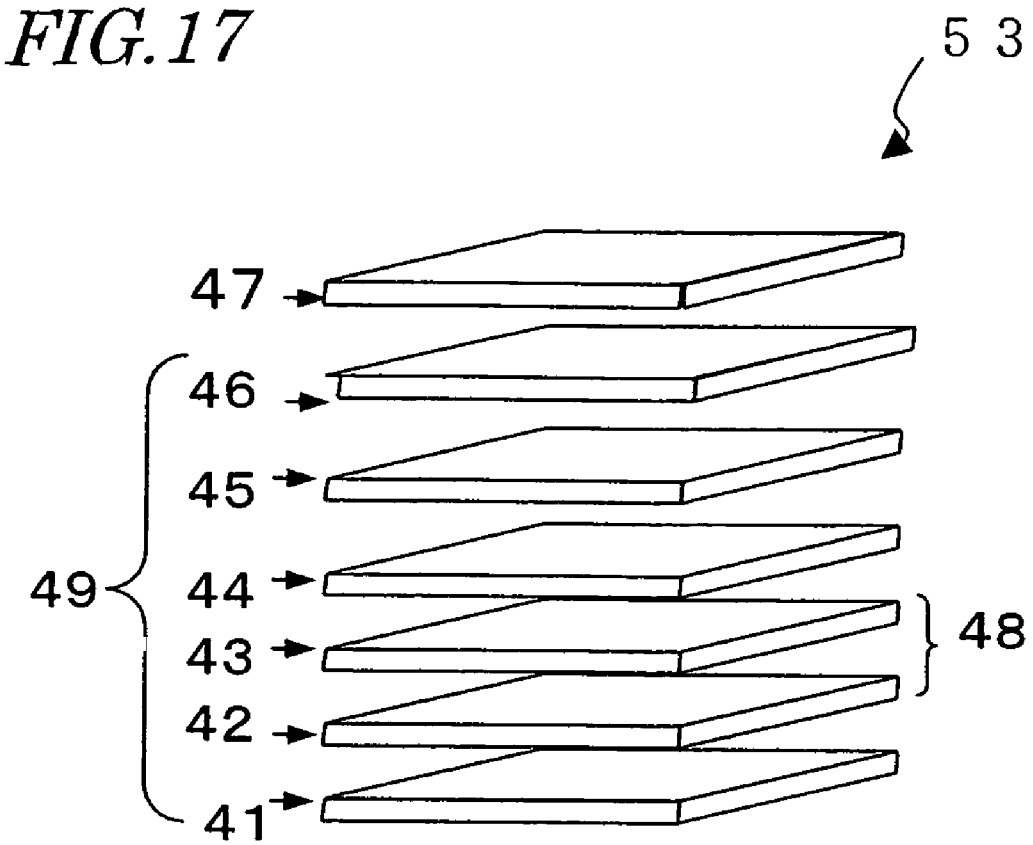
FIG. 17 is a view schematically illustrating a configuration for a display device with a touch sensor according to a third embodiment.

FIG. 17 schematically illustrates a configuration for a display device 53 with a touch sensor according to a third preferred embodiment of the present invention.

The display device 53 with a touch sensor includes a display panel 49, a location sensing transparent conductive film 47, and a sensor circuit (not shown in FIG. 17).

The display panel 49 includes at least a display medium layer 44, a transparent counter electrode 45, which is provided closer to the viewer than the display medium layer 44 is so as to drive the display medium layer 44, and an insulating layer (dielectric layer) 46, which is provided closer to the viewer than the transparent counter electrode 45 is. The location sensing transparent conductive film 47 is arranged so as to face the transparent counter electrode 45 with the insulating layer 46 of the display panel 49 interposed between them. The sensor circuit senses the variations in currents flowing from multiple points of the location sensing transparent conductive film 47.

The display device 53 with the touch sensor applies a periodically changing oscillating voltage to the transparent counter electrode 45, thereby generating an induced voltage, and creating an electric field, in the location sensing transparent conductive film 47. And the display device 53 generates the location data of a point of contact based on variations in the amounts of currents when the point of contact is defined on the location sensing transparent conductive film 47.

In a normal display device with a touch sensor, an induced voltage to be generated in a location sensing transparent conductive film by applying a common voltage to a transparent counter electrode is considered to be noise for the touch sensor. For that reason, to prevent the induced voltage from being generated in the location sensing transparent conductive film, the location sensing transparent conductive film is well spaced apart from the transparent counter electrode. Alternatively, a shield layer may be provided between the location sensing transparent conductive film and the transparent counter electrode. As another alternative, a sensor circuit for locating the point of contact may calculate the point of contact by subtracting a signal corresponding to that induced voltage from the sensed signal as described above.

In contrast, the display device 53 with the touch sensor according to this third preferred embodiment does generate the location data of a point of contact on the location sensing transparent conductive film 47 by intentionally using the induced voltage that is normally considered noise. Accordingly, there is no need to space the location sensing transparent conductive film 47 well apart from the transparent counter electrode 45 or to provide any shield layer between the display panel 49 and the location sensing transparent conductive film 47, either. As a result, a display device with a touch sensor, which can have a sufficiently reduced thickness and causes a small parallax, can be provided.

Also, in order to locate the point of contact, no particular voltage is applied to the location sensing transparent conductive film 47 but the induced voltage to be generated by applying a periodically changing oscillating voltage to the transparent counter electrode 45 is used. Accordingly, no complicated circuits are needed and the power dissipation does not increase, either. Furthermore, a voltage essentially applied to the display panel to drive the display medium layer may be used as such an oscillating voltage. In addition, there is no need to separately apply an alternating current voltage to the location sensing transparent conductive film 47 anymore.

Hereinafter, a specific example of the display device 53 with the touch sensor will be described with reference to FIG. 17. In the following example, an embodiment in which a liquid crystal panel is used as the display panel 49 will be described.

In the situation where a liquid crystal panel is used as the display panel 49, the display panel 49 includes not only the insulating layer 46, transparent counter electrode 45 and display medium layer 44 with a liquid crystal material but also an active-matrix substrate 48, which is arranged so as to face the transparent counter electrode 45 with the display medium layer 44 interposed between them, and a first polarizer 41 as shown in FIG. 17. In the active-matrix substrate 48, a TFT array 43 is provided on the principal surface of a substrate 42, which is made of a transparent material such as glass or plastic, and pixel electrodes (not shown) are arranged in matrix thereon.

The insulating layer 46 may be provided as a counter substrate such as a glass substrate or a plastic substrate, for example, and may further include color filters and a second polarizer if necessary. Alternatively, the color filters and the second polarizer may be provided closer to the viewer than the location sensing transparent conductive film 47 is. The insulating layer 46 is preferably thick enough to generate a sufficiently high induced voltage on the location sensing transparent conductive film 47.

A specific preferred thickness of the insulating layer 46 changes depending on the dielectric constant of the material included in the insulating layer. As will be described later, to generate a sufficiently high induced voltage on the location sensing transparent conductive film 47, a capacitor to be formed by the location sensing transparent conductive film 47, transparent counter electrode 45 and insulating layer between them preferably has a capacitance of about 200 pF or more. Accordingly, if a glass substrate is used as the insulating layer of a 3.7-inch liquid crystal panel, then the glass substrate preferably has a thickness of more than 0 mm to 1.1 mm. A glass substrate with a thickness of 0.4 mm or more is currently used. If the liquid crystal panel size exceeds 3.7 inches, the capacitor can still have a capacitance of about 200 pF or more even when the glass substrate is thicker than 1.1 mm.

Optionally, a protective coating may be additionally provided on the uppermost surface of the display device 53 so as to be closest to the viewer.

A liquid crystal panel is normally AC driven. This is mainly because a liquid crystal layer tends to have a shorter life when supplied with a direct current voltage. For that reason, a voltage, of which the polarity inverts periodically from positive into negative and vice versa, is applied as a common voltage to the transparent counter electrode 45.

Figure 18:
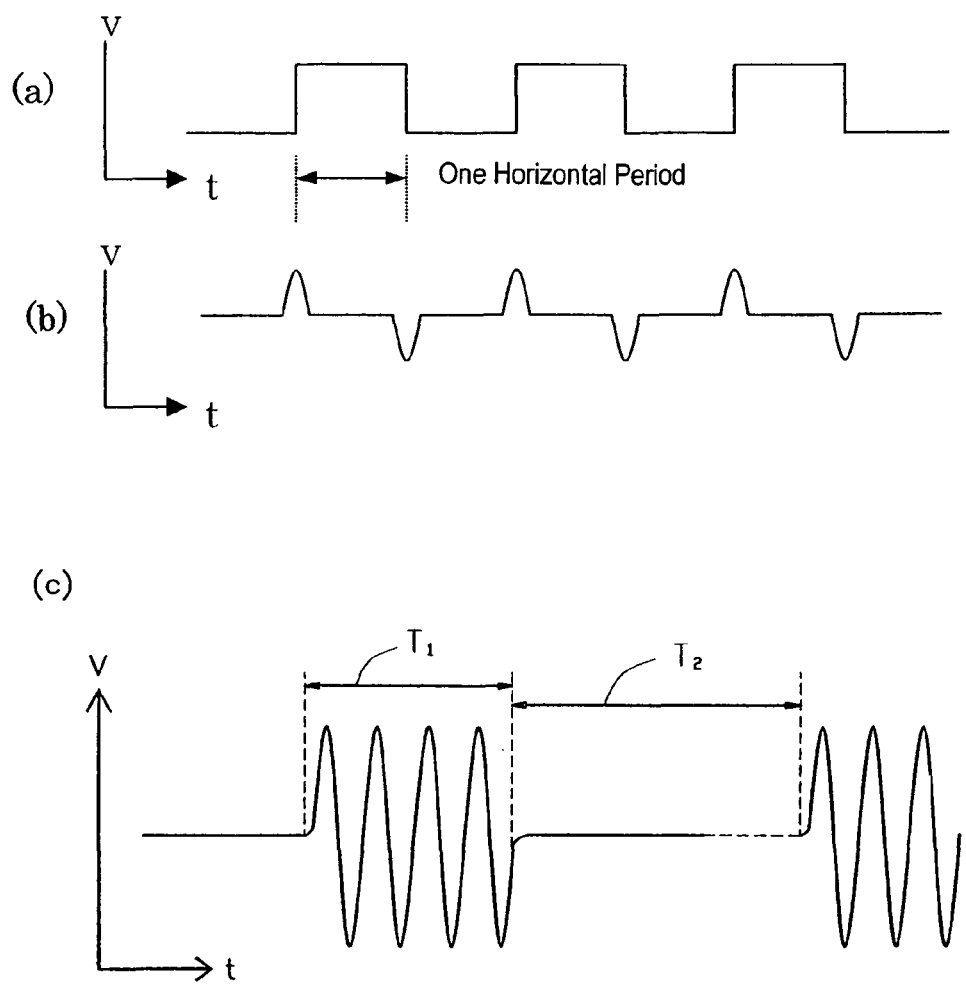
FIG. 18(*a*) shows how the common voltage applied to the transparent counter electrode of a display panel may change with time.

FIG. 18(a) shows how the common voltage being applied to the transparent counter electrode 45 of the display panel 49 may change with time. In FIG. 18(a), the ordinate represents the potential level at the transparent counter electrode 45 and the abscissa represents the time. The illustrated example is a line inversion drive. However, the present invention is in no way limited to this specific example.

As shown in FIG. 18(a), the common voltage has its polarity inverted from positive into negative, and vice versa, every horizontal period, and the absolute value of the positive voltage is equal to that of the negative voltage. In the display device 53 with the touch sensor, this common voltage is used as the oscillating voltage to generate the induced voltage on the location sensing transparent conductive film 47.

FIG. 18(b) shows how the induced voltage, generated on the location sensing transparent conductive film 47 when the common voltage shown in FIG. 18(a) is applied to the transparent counter electrode 45, changes with time. In FIG. 18(b), the ordinate represents the potential level at the location sensing transparent conductive film 47 and the abscissa represents the time. This induced voltage changes synchronously with the voltage applied to the transparent counter electrode 45 shown in FIG. 18(a) and is a pulse wave having a local maximum or local minimum value every horizontal period. The local maximum or local minimum values appear at an interval of approximately 40 kHz. It should be noted that the induced voltage shown in FIG. 18(b) is sufficiently greater than an induced voltage to be generated by the application of a display signal voltage to the active-matrix substrate 48, for example.

By generating the induced voltage shown in FIG. 18(b) on the location sensing transparent conductive film 47, an electric field with a small gradient is created substantially uniformly within the location sensing transparent conductive film 47.

The location sensing transparent conductive film 47 may include location sensing electrodes at the four corners thereof, for example. If a protective coating is provided on the uppermost surface of the display device 53 with the touch sensor so as to be located closest to the viewer, a point of contact is defined on the location sensing transparent conductive film 47 when the person touches the surface of the protective coating with a pen or a finger. When the point of contact is defined on the location sensing transparent conductive film 47, the location sensing transparent conductive film 47 is capacitively coupled with the ground (i.e., grounded plane). In this case, the capacitance created is the sum of the capacitance between the protective coating and the location sensing transparent conductive film 47 and the capacitance between the person and the ground.

The value of the electrical resistance between the point of contact and each of the electrodes at the four corners of the location sensing transparent conductive film 47, which are capacitively coupled together, is proportional to the distance from the point of contact to the electrode. Accordingly, a current flows through each of the electrodes at the four corners of the location sensing transparent conductive film 47 in an amount that is proportional to the distance between the point of contact and each electrode. Thus, by detecting the amounts of these currents, the coordinates of the point of contact can be obtained.

The display device with the touch sensor of the second preferred embodiment described above, for example, or any conventional normal display device with a touch sensor gets a predetermined alternating current voltage applied to the location sensing transparent conductive film by an oscillator circuit (e.g., the oscillator circuit 65 shown in FIG. 14), thereby creating an electric field with a small gradient within the location sensing transparent conductive film substantially uniformly and locating the point of contact. In contrast, the display device 53 with the touch sensor according to this preferred embodiment creates an electric field with a small gradient within the location sensing transparent conductive film 47 substantially uniformly by using the induced voltage to be generated on the location sensing transparent conductive film 47 upon the application of the oscillating voltage to the transparent counter electrode 45 as described above. Furthermore, the display device generates the location data of the point of contact based on the variation in current reflecting the variation in the electric field created in the location sensing transparent conductive film 47.

That is to say, the display device 53 with the touch sensor generates the location data of the point of contact by using the induced voltage that has never been used effectively in the prior art. Accordingly, the oscillator circuit, which has been believed to be required to apply an alternating current voltage to the location sensing transparent conductive film 47, is not needed anymore. As a result, the power can be saved as compared with a normal display device with a touch sensor. Also, since the induced voltage described above has usually been considered noise, a shield layer is sometimes provided between the transparent counter electrode 45 and the location sensing transparent conductive film 47 and/or the location sensing transparent conductive film 47 is sometimes well spaced apart from the transparent counter electrode 45 to minimize the generation of this induced voltage. However, this display device 53 with the touch sensor needs no such shield layers or no such spacing.

In this display device with the touch sensor, a pseudo capacitor is formed with a glass substrate or an air layer provided as an insulating layer (or dielectric layer) between the location sensing transparent conductive film 47 and the transparent counter electrode 45. In this preferred embodiment, the induced voltage is used for location sensing purposes as described above. Accordingly, if the display panel has a size of 3.7 inches (if the display plane has a diagonal length of 3.7 inches), then the capacitor preferably has a capacitance of 200 pF or more to generate a sufficiently high induced voltage.

For example, if the liquid crystal panel 10 has a size of 3.7 inches, a glass substrate with a thickness of 0.7 mm is provided between the transparent counter electrode 45 and the location sensing transparent conductive film 47, and an air layer with a thickness of 0.1 mm is provided as a gap between the glass substrate and the location sensing transparent conductive film 47, then the distance between the transparent counter electrode 45 and the location sensing transparent conductive film 47 will be 0.8 mm and the capacitor will have a capacitance of 192 pF.

When the distance between the transparent counter electrode 45 and the location sensing transparent conductive film 47 was 0.8 mm as described above and when a voltage such as that shown in FIG. 18(a) having an amplitude of 4.9 V was applied to the transparent counter electrode 45, an induced voltage such as that shown in FIG. 18(b) having an amplitude of 0.65 V was actually generated on the location sensing transparent conductive film 47. This induced voltage is high enough to carry out the location sensing of this preferred embodiment.

In a normal display device with a touch sensor on the other hand, the location sensing transparent conductive film was well spaced apart from the transparent counter electrode to minimize the generation of the induced voltage and decrease the capacitance of the capacitor.

For example, if the liquid crystal panel has a size of 3.7 inches, a glass substrate with a thickness of 0.7 mm is provided between the transparent counter electrode and the location sensing transparent conductive film, and an air layer with a thickness of 0.5 mm is provided as a gap between the glass substrate and the location sensing transparent conductive film, then the distance between the transparent counter electrode and the location sensing transparent conductive film will be 1.2 mm and the capacitor will have a capacitance of 62.5 pF. In a display device with a touch sensor of a conventional resistive film type, a distance, which is almost as long as the distance between the transparent counter electrode and the location sensing transparent conductive film, has been believed to be required between the resistive film and the transparent counter electrode.

In the display device 53 with the touch sensor, the distance between the transparent counter electrode 45 and the location sensing transparent conductive film 47 can be less than 1 mm, for example, as described above. Thus, as compared with a normal display device with a touch sensor, the location sensing transparent conductive film 47 can be brought closer to the transparent counter electrode 45, and therefore, the parallax can be reduced.

As described above, the display device 30 with the touch sensor of the second preferred embodiment (see FIG. 16) uses the AC drive oscillator circuit 65 (see FIG. 14) to apply voltages to the coordinate detecting conductive portions 35 and 36 of the location sensing transparent conductive films 32 and 34. In addition, a shield layer (not shown) is provided between the electrode (e.g., the counter electrode) of the transparent counter substrate 24 and the location sensing transparent conductive film 32 or 34 and/or the location sensing transparent conductive film 32 or 34 is well spaced apart from the counter electrode of the transparent counter substrate 24. If the third preferred embodiment is applied to this display device 30, then the induced voltage to be generated by applying a periodically changing oscillating voltage to the counter electrode of the transparent counter substrate 24 of the display panel 20 can be used to locate the point of contact.

Hereinafter, it will be described in further detail with reference to FIG. 16 how the third preferred embodiment is applied to the display device 30. In the following example, it will be described how to generate the induced voltage on the second location sensing transparent conductive film 34 upon the application of the oscillating voltage to the counter electrode.

If the third preferred embodiment is applied to the display device 30, the display panel 20 includes at least the display medium layer 26 and the transparent counter substrate 24 that is provided closer to the viewer than the display medium layer 26 is. The transparent counter substrate 24 includes an electrode for driving the display medium layer 26 and an insulating layer (e.g., a glass substrate), which is provided closer to the viewer than the electrode is. Also, the second location sensing transparent conductive film 34 is arranged so as to face the electrode with the insulating layer interposed between them. By applying a periodically changing oscillating voltages to the electrode, an induced voltage is generated, and an electric field is created, on the second location sensing transparent conductive film 34. The location data of the point of contact is generated in accordance with a variation in current when the point of contact is defined on the first and second location sensing transparent conductive films 32 and 34.

The above-described display device effectively uses the induced voltage, which has been considered to be noise, in locating the point of contact. Accordingly, there is no need to provide any shield layer between the electrode and the location sensing transparent conductive film 34 and/or to space the location sensing transparent conductive film 34 well apart from the electrode. In addition, to generate the location data of the point of contact, not the voltage specially applied to the location sensing transparent conductive film 34 but the induced voltage to be generated by applying the periodically changing oscillating voltage to the electrode may be used. Accordingly, the AC drive oscillator circuit for applying an oscillating voltage to the location sensing transparent conductive film 34 can be omitted. Consequently, if the third preferred embodiment is applied to the display device 37, then the parallax can be reduced, the display device can be downsized and the power dissipation can be cut down.

In the preferred embodiment described above, the induced voltage is generated from the common voltage being applied to the transparent counter electrode 45. However, the voltage being applied to the transparent counter electrode 45 to generate the induced voltage is not limited thereto.

For example, the oscillating voltage to generate the induced voltage on the location sensing transparent conductive film 47 may be applied to the transparent counter electrode 45 separately from the common voltage. FIG. 18(c) shows a specific example of such a situation. In FIG. 18(c), the ordinate represents the potential level of the transparent counter electrode 45 and the abscissa represents the time. One period of the potential of the transparent counter electrode 45 shown in FIG. 18(c) includes a period $T_1$ and a period $T_2$.

In the example shown in FIG. 18(c), the period in which the transparent counter electrode 45 is used as a common electrode for display (i.e., display mode) and the period in which the transparent counter electrode 45 is used as an electrode to generate the induced voltage on the location sensing transparent conductive film 47 (i.e., location sensing mode) are switched. The periods $T_1$ and $T_2$ correspond to the location sensing mode and display mode, respectively.

The electrodes at the four corners of the location sensing transparent conductive film 47 are connected to a sensor circuit (to be described later) by way of a switching circuit consisting of transistors, diodes and so on. By using this switching circuit, for example, the periods $T_1$ and $T_2$ can be switched alternately. That is to say, this switching circuit selectively connects electrically either a display circuit for supplying the transparent counter electrode 45 with a voltage or current to drive the display medium layer 44 or the sensor circuit (to be described later with reference to FIG. 19) for locating the point of contact to the transparent counter electrode 45.

During the period $T_1$, the electrodes at the four corners of the location sensing transparent conductive film 47 are connected to the sensor circuit. On the other hand, during the period $T_2$, the electrodes at the four corners of the location sensing transparent conductive film 47 are not connected to the sensor circuit.

First, in the period $T_1$ representing the location sensing mode, an oscillating voltage having a predetermined amplitude is applied to the transparent counter electrode 45, thereby generating an induced voltage having the predetermined amplitude on the location sensing transparent conductive film 47. During this period $T_1$, the electrodes at the four corners of the location sensing transparent conductive film 47 are connected to the sensor circuit to be described later. Thus, this sensor circuit will generate the location data of the point of contact.

On the other hand, in the period $T_2$ representing the display mode, a common voltage of a predetermined magnitude is applied. If the common voltage oscillates as described above, then the induced voltage is generated on the location sensing transparent conductive film 47. During this period $T_2$, however, the electrodes at the four corners of the location sensing transparent conductive film 47 are not connected to the sensor circuit. Accordingly, the induced voltage never affects the detection accuracy of the point of contact. It should be noted that if a constant voltage is applied to the transparent counter electrode 45 during this period $T_2$ as shown in FIG. 18(c), then no induced voltage will be generated on the location sensing transparent conductive film 47 and the switching circuit described above can be omitted.

The basic principle of the location sensing method by the electrostatic capacitive coupling technique for use in this third preferred embodiment is the same as that already described for the first preferred embodiment with reference to FIGS. 2 and 4, and the detailed description thereof will be omitted herein. In FIG. 4, for example, alternating current voltages having the same phase and same potential are applied to the location sensing transparent conductive film by way of the electrodes at the four corners thereof. In this third preferred embodiment, however, the alternating current voltage is not applied from an oscillator circuit, for example, to the location sensing transparent conductive film but is an induced voltage that has been generated by the oscillating voltage applied to the transparent counter electrode 45.

As already described for the first preferred embodiment, the point of contact on the location sensing conductive film 47 can be located based on the values of currents $i_1, i_2, i_3$ and $i_4$ (see FIG. 4) flowing through the four electrodes of the location sensing transparent conductive film 47.

In the foregoing description, the display panel 49 is supposed to be a liquid crystal panel (more particularly, the liquid crystal panel is supposed to be an active-matrix-addressed liquid crystal panel). However, the display panel 49 for use in this preferred embodiment is not limited thereto. Any arbitrary display panel may be used as long as a periodically changing oscillating voltage can be applied to the transparent counter electrode of the display panel. In this case, the oscillating voltage to be applied to the transparent counter electrode is preferably a voltage for driving the display medium layer. The oscillating voltage is required to generate the induced voltage on the location sensing transparent conductive film. However, if this oscillating voltage is a common voltage used for driving the display medium layer, then there is no need to separately apply a voltage for generating the induced voltage, as well as the common voltage, to the transparent counter electrode. Accordingly, compared with a normal display device, the power supply circuit will not get so complicated and the power dissipation will not increase so much.

The electrode to generate the induced voltage on the location sensing transparent conductive film 47 does not have to be the transparent counter electrode 45 described above. However, if multiple electrodes to which mutually different oscillating voltages are applied face the location sensing transparent conductive film 47, then the electric field to be created between these electrodes and the location sensing transparent conductive film 47 would become non-uniform and the location sensing accuracy might decrease. For that reason, to generate an electric field uniformly between the electrodes to generate the induced voltage and the location sensing transparent conductive film 47, the location sensing transparent conductive film 47 and the electrodes to generate the induced voltage are preferably provided so as to face each other at least in the entire sensing area of the location sensing transparent conductive film 47 in which the point of contact is located.

Next, the configuration of the sensor circuit to be provided for the display device 53 with the touch sensor will be described. The sensor circuit senses the variations in currents flowing from multiple points of the location sensing transparent conductive film 47 and generates the location data of the point of contact on the location sensing transparent conductive film 47 based on the current variations sensed.

Figure 19:
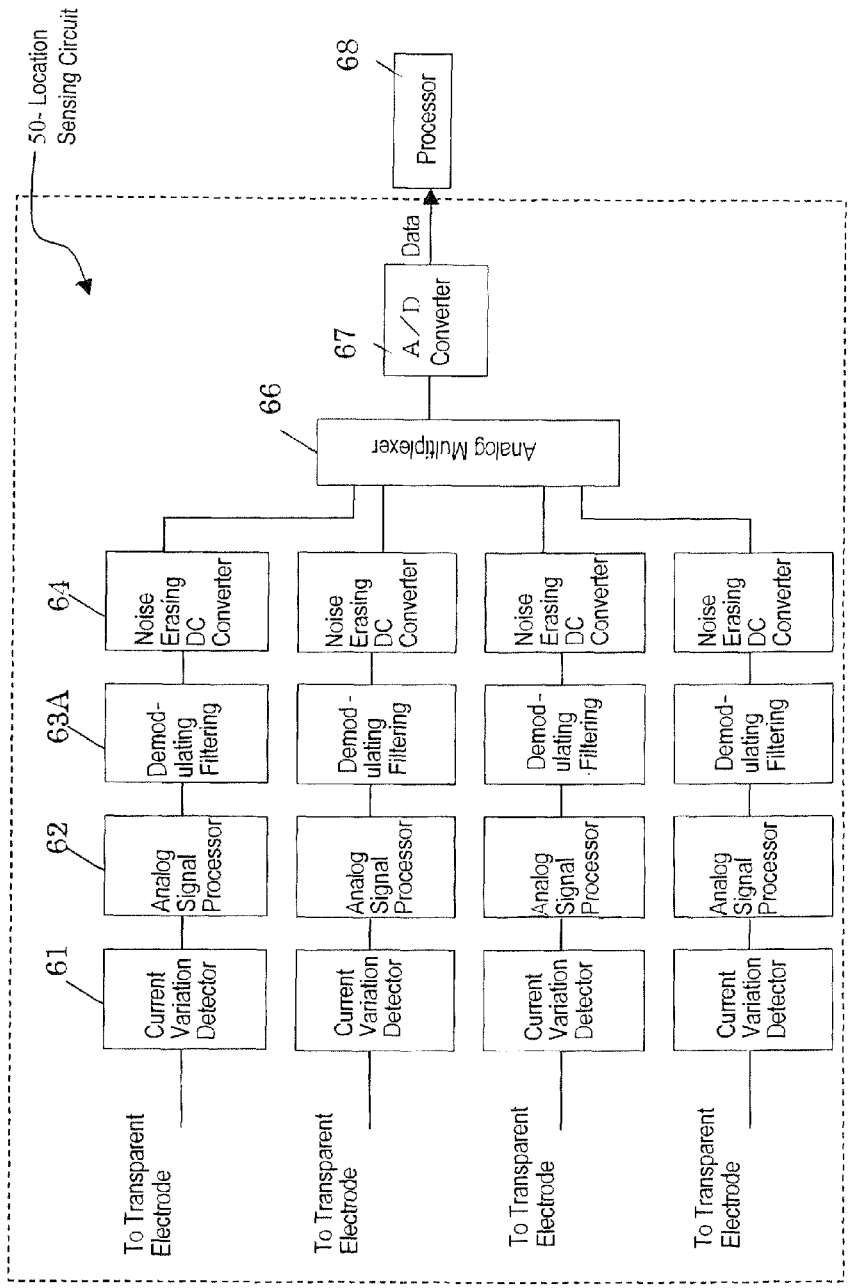
FIG. 19 is a block diagram showing an exemplary detector circuit.

FIG. 19 is a block diagram showing an exemplary sensor circuit 50. The sensor circuit 50 shown in FIG. 19 includes four current variation detector circuits 61. These four current variation detector circuits 61 are respectively connected to the electrodes at the four corners of the location sensing transparent conductive film 47. The number and arrangement of the electrodes to be provided for the location sensing transparent conductive film 47 are not limited thereto.

Each of the current variation detector circuits 61 measures the amount of current flowing between an associated one of the four electrodes of the location sensing transparent conductive film 47 and the ground. The induced voltage described above is applied to the location sensing transparent conductive film 47, and therefore, the currents flowing through the respective electrodes responsive to a finger contact, for example, have AC components.

The output of each current variation detector circuit 61 is subjected by its associated analog signal processor circuit 62 to amplification and band-pass filtering processes. Then, the output of each analog signal processor circuit 62 is demodulated by its associated demodulating filtering circuit 63A.

To remove various sorts of noise from its received signal, the demodulating filtering circuit 63A carries out filtering. The induced voltage (see FIG. 18(b), for example) to be generated on the location sensing transparent conductive film upon the application of a voltage to the transparent counter electrode has generally been considered to be noise. Accordingly, the noise to be removed by the conventional demodulating filter circuit includes a signal corresponding to the induced voltage.

In contrast, the sensor circuit of this preferred embodiment does use the induced voltage intentionally to locate the point of contact. For that reason, the demodulating filtering circuit 63A does not remove the signal corresponding to the induced voltage. This is why the demodulating filtering circuit 63A of this preferred embodiment includes no circuits for removing the signal corresponding to the induced voltage.

The output of each demodulating filtering circuit 63A is supplied to its associated noise erasing DC converter circuit 64. The noise erasing DC converter circuit 64 converts the output of its associated demodulating filtering circuit 63A into a direct current, thereby generating a signal having a value that is proportional to the amount of current flowing through its associated electrode. The noise erasing DC converter circuit 64 converts the detected current value into a voltage value, amplifies the voltage value to generate the signal, and then passes it to an A/D converter 67 by way of an analog multiplexer 66.

In the noise erasing DC converter circuit of the second preferred embodiment described above, the signal corresponding to the induced voltage has been removed from the signal (or voltage value) that has been received from the demodulating filtering circuit. Accordingly, the induced voltage such as that shown in FIG. 18(b) is not superposed on the signal that has been received from the demodulating filtering circuit, and the received signal has a waveform that changes continuously with time. Thus, the noise erasing DC converter circuit of the second preferred embodiment continuously supplies a voltage value having such a continuously changing waveform to the A/D converter by way of the analog multiplexer.

Figure 21:
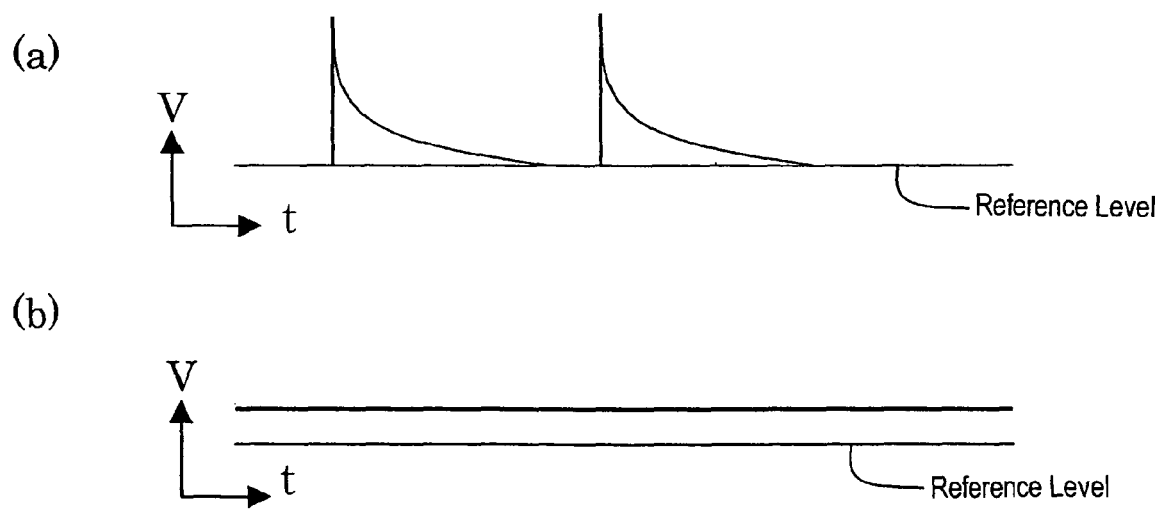
FIG. 21(a) shows how the signal received at a noise erasing DC converter circuit from a demodulating filtering circuit may change with time.
FIG. 21(b) shows how a DC voltage applied to an A/D converter changes with time.

In contrast, in this preferred embodiment, the induced voltage such as that shown in FIG. 18(b) is superposed on the signal (or voltage value) that has been received from the demodulating filtering circuit 63A, and the received signal has a discontinuous waveform such as that shown in FIG. 21(a). Thus, if the signal detected by the noise erasing DC converter circuit is continuously supplied to the A/D converter by way of the analog multiplexer as in the second preferred embodiment described above, then the signal is variable even while no point of contact is being input. As a result, the point of contact cannot be located accurately. FIG. 21(a) shows how the signal (or voltage value) that the noise erasing DC converter circuit 64 has received from the demodulating filtering circuit 63A may change with time. In FIG. 21(a), the ordinate represents the potential and the abscissa represents the time.

Figure 20:
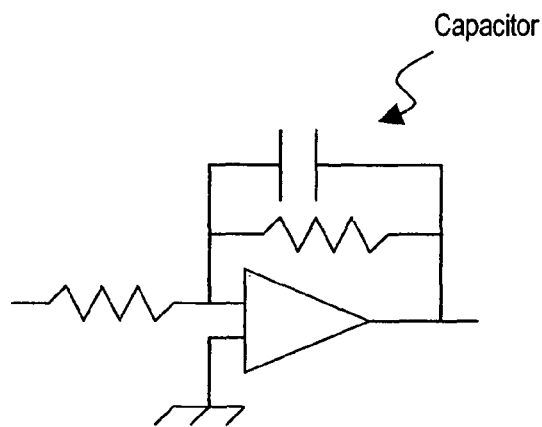
FIG. 20 shows an amplifier circuit included in a noise erasing DC converter circuit.

Thus, in the sensor circuit 50 of this preferred embodiment, the amplifier circuit included in the noise erasing DC converter circuit 64 is provided with a capacitor as shown in FIG. 20. For example, if the induced voltage is a pulse wave having local maximum or local minimum values at an interval of 40 kHz, then a capacitor having an electrostatic capacitance of several hundreds nF is preferably provided. By providing the capacitor, a current value to be detected while the induced voltage is present and a current value to be detected while the induced voltage is absent is averaged, thereby applying a direct current voltage to the A/D converter 67 as shown in FIG. 21(b). The point of contact can be located based on the difference between the direct current voltage value to be obtained when no point of contact is formed on the location sensing transparent conductive film 47 and the direct current voltage value to be obtained when a point of contact is defined thereon.

On receiving those signals from the noise erasing DC converter circuits 64, the analog multiplexer 66 passes the outputs of the four electrodes to the A/D converter 67. In response, the A/D converter 67 generates a digitized location signal (or location data) and supplies it to the processor 68. In this case, the location data refers to the data obtained by converting $i_1$, $i_2$, $i_3$ and $i_4$ of Equations (9) and (10) described above into direct current voltage values and then digitizing them. Using these values, the processor 68 obtains the X and Y coordinates by Equations (9) and (10), judges a command that has been input by the user who made the point of contact, and performs predetermined data processing and so on. The processor 68 is built in a personal digital assistant (PDA), an ATM, a ticket vending machine or any of various types of computers including the display device shown in FIG. 17 so as to carry out the data processing.

It should be noted that the location data generated by the sensor circuit 50 is not limited to the example described above. Alternatively, the sensor circuit 50 may obtain the X and Y coordinates by using the digitized direct current voltage values and then output the coordinates as the location data.

As described above, the third preferred embodiment provides a display device with a touch sensor, which is thin, causes just a small parallax and needs no complicated circuit configurations, and a method of generating location data.

INDUSTRIAL APPLICABILITY

According to the present invention, a touch sensor, which does not deteriorate display performance, is sufficiently lightweight and contributes to downsizing effectively, a display device with such a touch sensor, and a method of generating location data can be provided. In addition, a touch sensor, including simpler circuits than conventional ones, and a display device with such a touch sensor can also be provided.

The invention claimed is:

1. A display device with a touch sensor, the display device comprising: an active-matrix substrate including multiple pixel electrodes that are arranged in matrix on a first surface thereof; and a transparent counter electrode, which is opposed to the first surface of the active-matrix substrate,
    wherein the transparent counter electrode is used not only as a common electrode for display purpose but also as a location sensing transparent conductive film, and
    wherein the display device further includes:
    a driving circuit configured to supply a voltage or current to the transparent counter electrode for display purposes;
    a location sensing circuit configured to detect currents flowing from multiple points on the transparent counter electrode; and
    a switching circuit configured to switch between driving the pixels of the display device for display purposes and location sensing by selectively connecting electrically one of the driving and location sensing circuits to the transparent counter electrode.

2. The display device with the touch sensor of claim 1, wherein the switching circuit periodically switches the electrical connection of the driving or location sensing circuit to the transparent counter electrode in response to a control signal.

3. The display device with the touch sensor of claim 1, wherein at least a portion of the driving circuit, at least a portion of the location sensing circuit, and the switching circuit each include a thin-film transistor that is provided on the active-matrix substrate.

4. The display device with the touch sensor of claim 3, wherein the thin-film transistor includes polysilicon that is deposited on the active-matrix substrate.

5. The display device with the touch sensor of claim 3, wherein the transparent counter electrode includes a plurality of divided areas, and wherein a current flowing between both ends of each said area is detected by the location sensing circuit.

6. The display device with the touch sensor of claim 1, further comprising a liquid crystal layer between the pixel electrodes and the transparent counter electrode.

7. The display device with the touch sensor of claim 6, wherein the transparent counter electrode is provided on another substrate that faces the substrate, and wherein the liquid crystal layer is sealed between the two substrates.

8. The display device with the touch sensor of claim 1, further comprising an organic EL layer between the pixel electrodes and the transparent counter electrode.

9. The display device with the touch sensor of claim 1, wherein an operating plane of the touch sensor is on an opposite side of the transparent counter electrode from a side of the transparent counter electrode facing the active matrix substrate.

10. A display device with a touch sensor, the display device comprising: a first substrate including multiple scanning electrodes that are arranged on a first surface thereof; and a second substrate including multiple pixel data electrodes that are opposed to the first surface of the first substrate,
wherein the pixel data electrodes are used not only as data electrodes for display purpose but also as location sensing transparent conductive films, and
wherein the display device further includes:
a driving circuit configured to supply a voltage or current to each of said data electrodes for display purposes;
a location sensing circuit configured to detect currents flowing from multiple points on each of said data electrodes; and
a switching circuit configured to switch between driving the pixels of the display device for display purposes and location sensing by selectively connecting electrically one of the driving and location sensing circuits to the pixel data electrodes.

11. The display device with the touch sensor of claim 10, wherein at least a portion of the driving circuit, at least a portion of the location sensing circuit, and the switching circuit each include a thin-film transistor that is provided on the substrate.

12. The display device with the touch sensor of claim 11, wherein the thin-film transistor includes polysilicon that is deposited on the substrate.

13. The display device with the touch sensor of claim 10, further comprising a liquid crystal layer between the first and second substrates.

14. The display device with the touch sensor of claim 10, wherein an operating plane of the touch sensor is on an opposite face of the second substrate from a face of the second substrate facing the first substrate.

15. A display device with a touch sensor, the display device comprising: a first substrate including a first group of electrodes that are arranged on a first surface thereof; and a second substrate including a second group of electrodes that are opposed to the first surface of the first substrate,
wherein the electrodes of the first group are used not only as electrodes for display purpose but also as location sensing transparent conductive films, and
wherein the display device further includes:
a driving circuit configured to supply a voltage or current to each of said electrodes of the first group for display purposes;
a location sensing circuit configured to detect currents flowing from multiple points on each of said electrodes of the first group; and
a switching circuit configured to switch between driving the pixels of the display device for display purposes and location sensing by selectively connecting electrically one of the driving and location sensing circuits to the electrode of the first group.

16. The display device with the touch sensor of claim 15, wherein at least a portion of the driving circuit, at least a portion of the location sensing circuit, and the switching circuit each include a thin-film transistor that is provided on the substrate.

17. The display device with the touch sensor of claim 16, wherein the thin-film transistor includes polysilicon that is deposited on the substrate.

18. The display device with the touch sensor of claim 15, further comprising a liquid crystal layer between the first and second substrates.

19. The display device with the touch sensor of claim 15, wherein an operating plane of the touch sensor is on an opposite face of the first substrate from a face of the first substrate facing the second substrate.

* * * * *